United States Patent [19] [11] Patent Number: 4,830,456
Kakii et al. [45] Date of Patent: May 16, 1989

[54] OPTICAL CONNECTOR AND PROCESS FOR PRODUCING THE SAME

[75] Inventors: Toshiaki Kakii; Kazuhito Saito; Shuzo Suzuki, all of Kanagawa, Japan

[73] Assignee: Sumitomo Electric Industries, Ltd., Osaka, Japan

[21] Appl. No.: 120,521

[22] Filed: Nov. 13, 1987

[30] Foreign Application Priority Data

| Nov. 15, 1986 | [JP] | Japan | 61-272538 |
| Dec. 3, 1986 | [JP] | Japan | 61-288539 |
| Jan. 16, 1987 | [JP] | Japan | 62-8761 |
| Mar. 27, 1987 | [JP] | Japan | 62-75285 |
| May 11, 1987 | [JP] | Japan | 62-114236 |
| Sep. 8, 1987 | [JP] | Japan | 62-224373 |
| Sep. 11, 1987 | [JP] | Japan | 62-229420 |

[51] Int. Cl.$^4$ .............................................. G02B 6/36
[52] U.S. Cl. ................................. 350/96.20; 350/320
[58] Field of Search ............... 350/96.20, 96.21, 96.22, 350/320

[56] References Cited

U.S. PATENT DOCUMENTS

| 4,252,407 | 2/1981 | Bubanko et al. | 350/96.21 |
| 4,253,730 | 3/1981 | Logan et al. | 350/96.21 |

FOREIGN PATENT DOCUMENTS

| 2902089 | 9/1980 | Austria | 350/96.21 |
| 0009117 | 8/1979 | European Pat. Off. | 350/96.21 |
| 0005792 | 12/1979 | European Pat. Off. | 350/96.21 |
| 3443693 | 6/1986 | Fed. Rep. of Germany . | |
| 2406211 | 5/1979 | France | 350/96.21 |
| 1520679 | 8/1978 | United Kingdom | 350/96.21 |

OTHER PUBLICATIONS

Patent Abstracts of Japan, vol. 6, No. 241, pp. 158, 1119.

Primary Examiner—William L. Sikes
Assistant Examiner—Frank Gonzez
Attorney, Agent, or Firm—Cushman, Darby & Cushman

[57] ABSTRACT

An optical connector comprises an optical fiber connector ferrule which comprises a substrate plate having at least one optical fiber groove and pin grooves each being formed at one surface thereof, and a cover plate joined to the substrate plate to form at least one optical fiber groove holes into which an optical fiber is inserted; a guide pin means to be inserted into the pin grooves for coupling the optical fiber connector ferrule with another; and means for absorbing the variation in the diameter of the guide pin means. A process for producing an optical connector comprises the steps of: preparing a substrate plate wafer and a cover plate wafer; forming a plurality of optical fiber grooves on a top surface of said substrate plate wafer and a plurality of windows in said cover plate wafer; stacking the cover plate wafer on the substrate plate wafer; heating the cover and substrate plate wafers at an elevated temperature to join them into a unitary assembly; cutting the unitary assembly in a direction that is parallel to the plurality of optical fiber grooves and in a direction that is perpendicular to the plurality of optical fiber grooves and in traversing the centers of the plurality of windows in the cover plate wafer to produce a plurality of chips of optical fiber connector ferrule having a cutout in the rear portion of each cover plate; and fixing a plurality of optical fibers in a fiber array in position in a plurality of optical fiber holes.

47 Claims, 22 Drawing Sheets

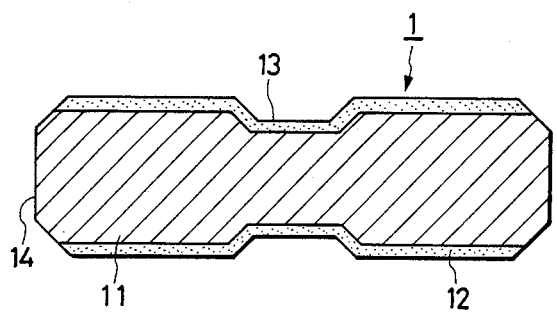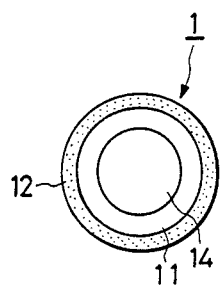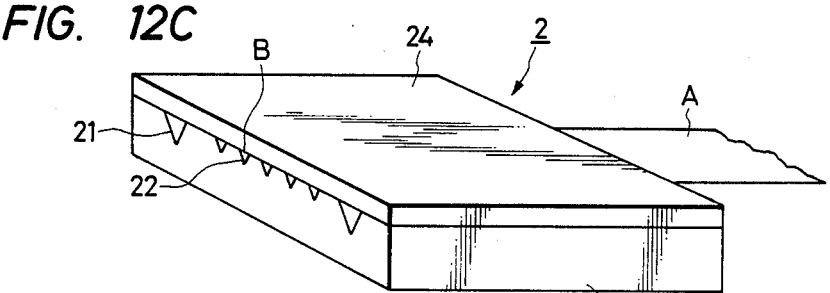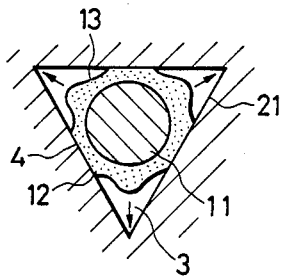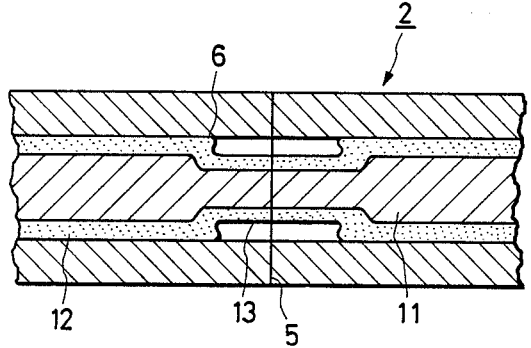

OPTICAL CONNECTOR AND PROCESS FOR PRODUCING THE SAME

BACKGROUND OF THE INVENTION

1. Field of the Invention

The present invention relates to a wire material positioning connector, particularly to an optical connector that uses guide pins to couple optical connector ferrules together for fixing optical fibers in position in lightwave communications systems. The present invention also relates to a process for procuding such a connector.

2. Prior Art

FIG. 1 is a sketch of a typical example of the prior art optical connector. In FIG. 1, the numeral 10 denotes an optical connector ferrule formed by resin molding; a ribbon fiber (A) contains five optical fibers 15 which are fixed in position side by side at a pitch of, say, 0.3 mm, and guide pin holes 16 are formed on both sides of the ribbon fiber at a pitch of 3.6 mm. Indicated by 17 is a guide pin having a diameter of, say, 0.7 mm. Two such guide pins 17 are inserted into guide pin holes 16 formed in one optical connector ferrule 10, then inserted into the corresponding holes in the other ferrule which is positioned in registry with the first ferrule, and the two optical connectors are coupled together.

In the present invention, the term "optical connector ferrule" is used to designate the most important basic member of an optical connector which fixes optical fibers in position so as to couple them together.

When coupling multi-fiber optical connectors 10, it is necessary that the optical fibers in one connector should abut in a very precise manner against those in the other connector in order to minimize the coupling loss. This requirement is particularly stringent when coupling single-mode fibers which have a core diameter of only about 10 μm and even an axial displacement of no more than about 1 μm between fibers will cause a great coupling loss. To avoid this problem optical fibers to be mounted on an optical connector must be positioned in the proper place with very high precision. In coupling two optical connectors, it is also necessary that they should be positioned with high precision by means of guide pins.

In order to realize low-loss coupling of multi-fiber optical connectors of the type described above, it is first of all necessary that optical fiber guide holes and guide pin holes should be provided at designated positions by precision machining. But even if this requirement is met, some clearance still remains both between the optical fiber guide holes and optical fibers and between the guide pin holes and guide pins and because of the existence of such clearance, it is not always possible to achieve low coupling loss. Even if the clearance is only about 0.5 μm both between optical fiber guide holes and optical fibers and between guide pin holes and guide pins, optical fibers will experience an axial offset of about 1 μm in an extreme situation.

Therefore, in order to realize low coupling loss, it is essential that each of these clearances be entirely eliminated or reduced as close as possible to zero. However, in consideration of the variation in the inside diameter of optical fiber guide holes and guide pin holes, as well as the variation in the outside diameters of optical fibers and guide pins, it is by no means easy to reduce these clearances. If an optical fiber guide hole should have an inside diamete smaller than the outside diameter of an optical fiber to be inserted thereinto, not only is it impossible to insert the optical fiber but also the fiber itself may break. If the inside diameter of a guide pin hole is smaller than the outside diameter of a guide pin to be inserted thereinto, the guide pin, which must be forced into the guide pin hole, will break either itself or the guide pin hole.

Suppose that guide pins are to be inserted into guide pin holes in a multi-fiber optical connector. If the precision of machining is within ±1 μm both for the guide pin diameter which should be 0.700 mm and for the inside diameter of the guide pin hole which should be 0.701 mm, there is a high likelihood that some of the guide pins will have an outside diameter of 0.701 mm while some guide pin holes have an inside diameter of 0.700 mm. In this situation, none of the guide pins can be inserted into any guide pin holes.

As described above, the efforts so far made to minimize the clearance that exists between guide holes and wire materials when the latter are to be fixed in position in the former have been limited by the precision of machining and this means that there is a certain limit on the effort toward reducing the coupling loss that occurs in coupling connectors such as multi-fiber optical connectors. Therefore, these problems have been a major obstacle to the goal of achieving low-loss coupling of optical connectors.

With an optical connector of the type shown in FIG. 1, some clearance (g), as shown in FIG. 2, is necessary for permitting a guide pin 17 to be smoothly inserted into a guide pin hole 16 in an optical connector ferrule 10. However, the provision of this clearance (g) causes the problem that the coupling loss occurring in coupling optical connectors, in particular, those optical connectors which are used to achieve precise positioning of single-mode fibers with a core diameter of 10 μm, will vary as a result of repeated connect/disconnect cycles.

Stated more specifically, if a variation of 0.5 μm occurs on account of the clearance (g) as a result of repeated connect/disconnect cycles, the optical connectors that were initially connected to produce a coupling loss of 0.5 dB will eventually produce a variation of about ±0.3 dB after repeated connect and disconnect operations. This amount of variation is greater than the initial value of coupling loss. It is therefore clair that in order to realize low-loss and stable coupling of single-mode fibers, the connect/disconnect variation resulting from the clearance (g) for guide pins 17 must be reduced. However, if the clearance (g) is reduced, it becomes difficult to smoothly insert the guide pin 17 into the guide pin hole 16.

These problems could be solved by employing a guide pin that is in the form of an elastic slit pipe 18 which has a longitudinal slit 18a as shown in FIG. 3. However, in order to fabricate a slit pipe having an outside diameter of 0.7 mm with a wall thickness of 0.1 mm, the pipe must be worked to have an inside diameter of 0.5 mm and it is difficult and very expensive to achieve by such micro-machining the precise working of the pipe to attain perfect roundness in its outside diameter and accuracy in other shape parameters.

In order to reduce the size of an optical connector, the size of guide pins must also be reduced but to this end, the diameter of each guide pin has to be decreased to 0.5 mm and even to 0.3 mm, making the machining of an elastic slit pipe 18 more and more difficult.

FIG. 4 is a cross section o another example of the multi-fiber silicon chip array optical connector 160 which is conventionally used as an optical fiber connecting member. Two silicon chip guides 161 that are etched on both surfaces are stacked on each other, with optical fibers (A) being aligned on the mating surfaces. A silicon guide plate 162 having coupling guide grooves is fitted onto the other surface of each silicon chip guide 161 and the assembly is fixed with a clip plate (not shown) to secure the coupling of the fibers.

The above-described problems are absent from the optical connector shown in FIG. 4 since it does not employ any guide pins. However, in this type of optical connector, fiber coupling is achieved using the guide grooves and the coupled fibers must be subsequently clamped with a clip plate. Therefore, this arrary connector cannot be connected or disconnected or switched to another channel as readily as in the case of ordinary optical connectors. Furthermore, this array connector, which is made of silicon, is vulnerable to impact and may be easily nicked at side edges upon application of impact such as the one produced when it is dropped. In addition, even if the coupled fibers are fixed with a clip plate, the compressive force is not directly exerted upon the faces at which the fibers are coupled together, so the joint provided by this type of optical connector is comparatively weak to a tensile force.

FIG. 5 is a cross section showing a further example of the prior att optical fiber coupling member in which a grooved substrate having optical fiber guide grooves formed thereon is joined to a plate with a layer of an adhesive material interposed therebetween. As shown, a plate 201 having a layer of an adhesive material 203 provided on she underside is stacked on a grooved substrate 202 having optical fiber guide grooves 204 and guide pin grooves 205 formed in its top surface, and the plate 201 and the grooved substrate 202 are joined with the layer of an adhesive material 203 to form optical fiber guide holes and guide pin holes.

As is clear from FIG. 6 which shows the interface between the plate 201 and the grooved substrate 202 on an enlarged scale, the layer of an adhesive material 203 is present not only at the interface between the plate 201 and the substrate 202 but also on the upper plate 201 over an optical fiber guide groove 204, and the thickness of the layer 203, $t_3$, present in the latter area is generally greater than the thickness of the layer 203, $t_1$, present at the interface between the plate 201 and the substrate 202 by an amount that corresponds to the excess portion of the adhesive material which has been displaced from that interfacial area.

Each of the optical fibers (A) inserted into optical fiber guide holes are supposed to be held in position by establishing contact with three points (a) (see FIG. 7) in each optical fiber guide groove 204. Even if a layer of an adhesive material 203 is present between the plate 201 and the grooved substrate 202 as shown in FIG. 8, an optical fiber (A) having the same diameter as that of the fiber shown in FIG. 7 is held in position by establishing contact with three points in an optical fiber guide groove 204 if the adhesive layer 203 has a uniform thickness as in the case shown in FIG. 8.

However, in fabricating the optical fiber coupling member shown in FIG. 6, the plate 201 is joined to the grooved substrate 202 with some pressure being applied to cure the layer of an adhesive material 203, and this causes the adhesive layer 203 present between the two members to be displaced toward an optical fiber guide groove 204. As a result, the thickness of the adhesive layer 203, $t_3$, present over the groove 204 will become greater than its thickness at the other areas, $t_1$, as shown in FIG. 6, thereby making it impossible for an optical fiber with a predetermined outside diameter to be inserted into the groove 204.

The adhesive layer over optical fiber guide groove 204 has the additional disadvantage that it easily picks up dust particles and other foreign matter by absorption or adsorption and produces high and low spots in the wall of grooves 204. The deposition of such dust particles often makes it difficult for optical fibers to be smoothly inserted into grooves 204. In addition, dust particles can cause inaccuracy in the measurement of the cross-sectional profile of grooves 204 by producing a blurred hole contour.

FIGS. 9A and 9B illustrate a still further example of the prior art optical fiber coupling member. As shown, optical fibers (B) are inserted into optical fiber guide grooves 323 that have bee formed in the top surface of a substrate 321, and a holding plate 322 is placed on the grooved substrate 321 with a layer of an adhesive agent being interposed, and the combination is pressed from above to have the optical fibers (B) fixed in the optical fiber guide grooves 323.

However, this prior art optical fiber coupling member has the following problems.

(1) The coupling member is assembled by clamping optical fibers in such a manner that they are sandwiched between the grooved substrate and the holding plate. This method is not suitable for assembling a multi-fiber coupling member since the need to employ the grooved substrate and the holding plate makes the handling of optical fibers complicated and presents much difficulty in achieving precise assembly operations.

(2) An adhesive agent applied between the grooved substrate and the holding plate might flow out from the laterial side of the gap between the two components and it is by no means simple to deal with the outflow of the adhesive agent.

(3) If an adhesive agent is applied to the optical fiber guide grooves before optical fibers are set in these grooves, it is not easy for the operator to be sure that he is installing the fibers in the right place. If an adhesive agent is applied after optical fibers have been set in the guide grooves, the lower part of the guide grooves will not be entirely filled with the adhesive agent.

As shown in FIGS. 10A to 10C, an optical connector ferrule 20 formed by resin molding has two guide pin holes 421 formed therein. Individual optical fibers (B) in a fiber array (A) are precisely fixed in position with respect to the guide pin holes 421. The two guide pins 422 are first inserted into the guide pin holes 421 in one connector ferrule, then inserted into the corresponding holes in the other ferrule which is positioned in registry with the first ferrule, thereby allowing the two ferrules to be coupled together as shown in FIG. 10C. The optical connector shown in FIG. 10 is of the four-fiber type employing guide pins having an outside diameter of 0.7 mm; the individual optical fibers (B) are arranged at a pitch of 0.25 mm on the line connecting the axes of guide pin holes 421 which are spaced apart by a distance of 3.600 mm.

For practical applications, the optical connector ferrule described above are subjected to appropriate secondary working depending upon its specific use. For instance, the ferrule is flanged or, as shown in FIG.

11A, is accommodated in a housing to form an optical connector plug 23 that can be easily connected or disconnected from an optical connector adapter 424. Alternatively, in order to secure the coupling of two ferrules, they are fixed with a clip 425 of the type shown in FIG. 11A.

The prior art optical connector shown in FIGS. 10A to 10C which uses guide pins to achieve coupling has the problem that there is no way of knowing which of the two ferrules 420 will retain guide pins 422 after disconnecting the optical connectors. If, in the coupling method shown in FIG. 11A which employs two optical connector plugs 423 and an adapter 424, the plug into which the guide pins 422 were initially inserted is disconnected, it sometimes occurs that the guide pins are left behind in the other plug. If the other plug is situated in a machine or a casing, or if it is a component on the wall such as a receptacle or an optical outlet, the guide pins on another optical connector cannot be coupled to the other plug in the adapter unless the operator is sure that no guide pin is left in the other plug.

This randomness of the site in which guide pin are left behind after disconnecting optical connectors could be dealt with by permanently fixing guide pins in selected optical connector ferrules with an adhesive agent, but then it becomes impossible to couple two connector ferrules if each of them has guide pins permanently fixed therein. Another approach would be that one guide pin is permanently fixed in every connector ferrule on a predetermined side, for example, on the right-hand side of the ferrule. But the applicability of this method is limited since in lightwave communications it sometimes becomes necessary to couple two ribbons of optical fibers with matching being established between the identification numbers of the individual fibers and, in such a case, one ribbon fiber may be required to be turned by 180° before it is coupled to the other ribbon fiber.

Another problem involved in permanently fixing guide pins in optical connector ferrules is that deformed guide pins cannot be replaced by normal pins and that the end faces of connector ferrules at which they are coupled together cannot be reground and repolished as required. For these disadvantages, the idea of permanently fixing guide pins in optical connector ferrules has not gained popularity in commercial operations

SUMMARY OF THE INVENTION

An object of the invention is to provide an optical fiber connector that is free from the aforementioned problems.

Another object of the invention is to provide an optical fiber connector which is equipped with guide pins that are reduced in diameter and which ensures high dimensional precision and can be produced in large quantities.

A further object of the invention is to provide an optical fiber connector that tolerates a certain dimensional variation in working due to the limited precision of machining skill and that enables a wire material to be precisely positioned with reduced clearance.

A still further object of the invention is to provide an optical fiber connector that does not permanently fix any guide pins in an optical connector ferrule and which yet enables the operator to correctly identify the connector ferrule in which guide pins are left behind after disconnecting the connector.

The aforementioned object of the present invention can be achieved by providing an optical fiber connector with a guide pin that is formed by a complex which is composed of a core member having a high Young's modulus and an outer layer having a low Young's modulus.

The aforementioned object of the present invention can be achieved by providing an optical fiber connector in which an optical fiber guide member is formed by placing a flat plate on a grooved substrate having optical fiber guide grooves and guide pin grooves formed on its top surface in such a way that the guide pin grooves are exposed while the flat plate is joined to said substrate to cover the optical fiber guide grooves, and in which guide pins that are positioned in said exposed guide pin grooves are fixed by means of a clamper having a resilient compressive force to effect coupling of two optical connectors.

The aforementioned object of the present invention can be achieved by providing an optical fiber connector having a wire material positioning member in which a slit that runs substantially parallel to the axial direction and which communicates with the guide hole is provided either in part of the wall of the guide hole or in the vicinity of the guide hole.

The aforementioned object of the present invention can be achieved by providing an optical fiber connector in which the thickness of a layer of an adhesive material over optical fiber guide grooves in a grooved substrate is smaller than the thickness of the same layer present between a grooved substrate and an overlying plate, or alternatively, no layer of an adhesive material is present over the optical fiber guide grooves.

The aforementioned object of the present invention can be achieved by providing an optical fiber connector in which a grooved substrate having optical fiber guide grooves in the top surface thereof by machining and a cover plate that is to be stacked on the grooved substrate to form optical fiber guide holes are joined in such a manner that at least part of the joint is attained by a heat treatment without employing any adhesive agent.

The aforementioned object of the present invention can be achieved by providing a process for processing an optical fiber connector which comprises the steps of: stacking a cover plate wafer on a grooved wafer having a plurality of optical fiber guide grooves formed in the top surface thereof by machining; heating the two wafers at an elevated temperature so that they are joined together into a unitary assembly; and cutting the assembly into discrete optical fiber coupling members each of which consists of a grooved substrate chip and a cover plate chip joined thereto.

The aforementioned object of the present invention can be achieved by providing an optical fiber connector in which a cover plate is joined to a grooved substrate having optical fiber guide grooves formed in the top surface thereof by machining in such a runner that optical fiber guide holes are formed, and that the portion of the cover the rear part of the optical fiber guide grooves is removed to form a cutout in which the rear part of the optical fiber guide grooves is exposed.

The aforementioned object of the present invention can be achieved by providing an optical fiber connector in which each of the guide pin holes is partly exposed from the optical fiber connector ferrule and the guide pins still remain exposed in that area of the guide pin holes when two optical connectors are coupled together.

BRIEF DESCRIPTION OF THE DRAWINGS

FIGS. 10A to 10C shows an example of the prior art optical connector in which FIG. 10A is a top view showing two connectors before they re coupled together, FIG. 10B is a cross section of FIG. 10A as seen in the direction indicated by arrows $X_1$–$X_2$, and FIG. 10C is a top view showing the connectors in a coupled state;

FIG. 12A is a longitudinal section showing a guide pin for use in an optical connector according to the present invention;

FIG. 12B is a front view showing the right-hand end of the guide pin shown in FIG. 12A;

FIG. 12C is a perspective view of an optical connector ferrule in tee optical connector of the present invention;

FIGS. 13A and 13B illustrate how two different types of deformation that occurs in the low-Young's modulus member of the guide pin are absorbed;

FIGS. 40A and 40B illustrate an optical connector ferrule into which guide pins have been inserted and which is equipped with a clamp mechanism, in which FIG. 40A is a longitudinal section and FIG. 40B is a top view;

DETAILED DESCRIPTION OF THE PREFERRED EMBODIMENTS

Figure 1:
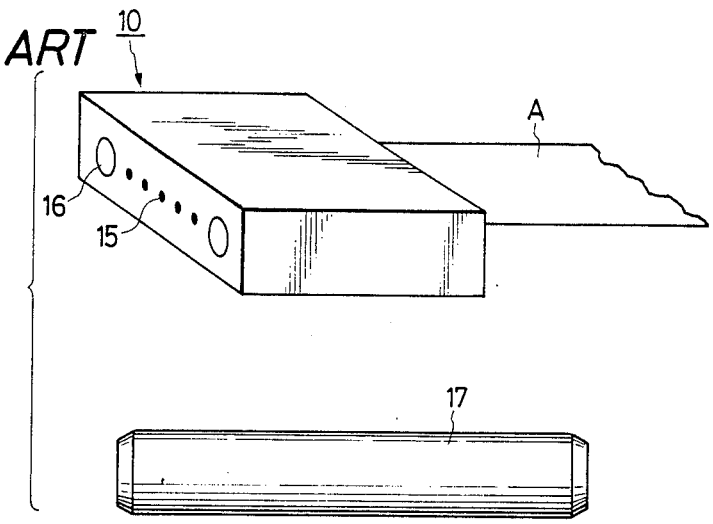
FIG. 1 is a sketch showing a typical example of the prior art optical connector.

As shown in FIGS. 12A and 12B, the guide pin used in the present invention is composed of a core member 11 that serves as the central member and which is formed of a material such as a metal having a high Young's modulus and an outer layer 12 that is formed around said core member 11 and which is made of a material having a low Young's modulus as typified by a plastic or an elastomer. The middle portion of the guide pin is provided with a small-diameter portion 13 and both ends of the pin are tapered as indicated by 14.

The optical connector ferrule 2 is fabricated as follows: a V-grooved plate 23 that may be made of a hard and brittle material such as silicon or a ceramic and which is provided on its top surface with V grooves for accommodating guide pins and optical fiber guide V grooves is overlaid with a flat plate 24, with a thin layer of adhesive being interposed, so as to form triangular guide pin holes 21 and optical fiber guide holes 22 in which the individual optical fibers (B) in the ribbon fiber (A) are to be fixed in position.

The term "Young's modulus" used for the high Young's modulus member 11 and the low-Young's modulus member 12 of which the guide pin 1 is formed should be taken in a relative sense and when the guide pin 1 is being inserted into the guide pin hole 21, part of the low-Young's modulus member 12 will easily deform in such a way that the guide pin 1 is fixed in contact with the guide pin hole 22, with little or no clearance being left between the pin and the hole.

Figure 14A:
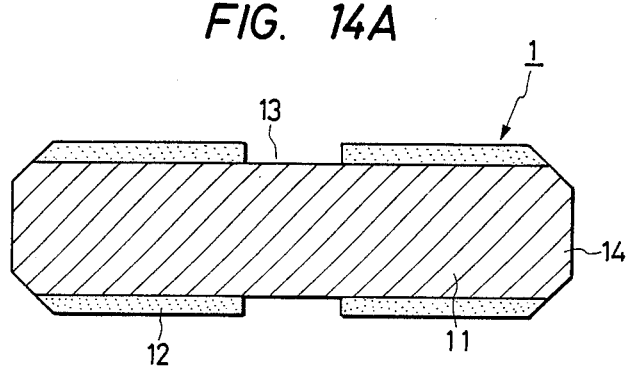
FIGS. 14A and 14B are longitudinal sections of guide pins according to the present invention.
Figure 14B:
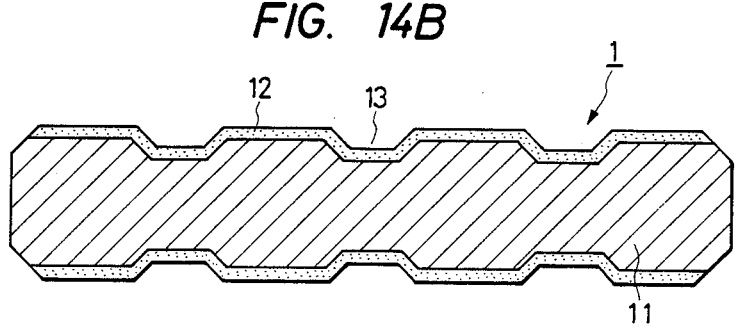

The small-diameter portion 13 is formed in the middle portion of the guide pin 1 so that an axial deformation that occurs in the outer layer 12 made of a low-Young's modulus material will be absorbed by this small-diameter portion 13. In addition to the shape depicted in FIG. 12A, the small-diameter portion 13 may be formed by removing the protective layer 12 of low Young's modulus in this middle portion as shown in FIG. 14A. Or alternatively, a plurality of small-diameter portions 13 may be formed as depicted in FIG. 14A.

In order to permit the outer layer 12 of low Young's modulus to deform in an easy and consistent manner, it would be effective to provide triangular guide pin holes 21 in the optical connector ferrule 2. By so doing, the guide pin 1 can be fixed in contact with three points as shown in FIG. 13A and any deformation that occurs in the guide pin can be spontaneously absorbed by the gap 3 formed at the three apexes of the triangle. It should be noted that if the guide pin is combined with a round hole as in the prior art, the number of sites at which deformation can be absorbed is so small that great difficulty is encountered in inserting the deforming guide pin 1 into the hole.

Needless to say, the outer layer 12 of low Young's modulus is preferably made of a material that ensure high reliability over time (e.g. small creep deformation), can be machined to provided high dimensional precision, produces good adhesion to the core member 11 of high Young's modulus, and which exhibits high resistance to temperature, humidity and chemicals. More preferably, the outer layer 12 is made of a material that displays good elastic characteristics in addition to the features listed above, and generally speaking, elastomers having great elasticity are preferred. However, the maximum amount of deformation that is anticipated to occur in the present invention is 2-3 $\mu$m and in this sense, it is a phenomenon that develops in the range of "small" deformation. Therefore, the elastomer may be effectively replaced by plastic materials that have lower Young's moduli than metals having high Young's moduli and which, as is clear from the Hertz theory of contact, are more easy to deform than metals.

The core member 11 of high Young's modulus may of course be made of a hard and brittle material such as a ceramic or glass but more preferably it is made of a metallic material that can be easily machined to provide dimensional accuracy in outside diameter. Members made of metals and other materials having high Young's modulus can be worked by centerless machining to provide high dimensional precision in outside diameter on a commercial scale to an accuracy of $\pm 1$-2 $\mu$m. The thin layer of low Young's modulus can be formed by a suitable coating technique that is capable of controlling the pulling speed to be constant, such as dip coating, vacuum evaporation, sputtering or spin coating, which may be appropriately selected depending upon the film thickness to be attained and on the material used. From the viewpoint of quick curing that is necessary to achieve high production rate, a resin that cures upon exposure to ultraviolet rays may be selected as the material of low Young's modulus.

The high-Young's modulus member of the guide pin 1 used in the present invention forms the core portion 11 which provides the guide pin with the necessary strength and basic dimensions. The outer layer 12 of low Young's modulus is formed of a thin layer of coating and part of it will easily deform when the guide pin is inserted into the guide pin hole 21, thereby ensuring that the pin is urged against the wall of the hole to realize consistent positioning of the pin. The main thrust of the present invention is that the clearance between the guide pin hole and the guide pin which is coupled thereto is entirely eliminated or drastically reduced to a value on the submicron order, and it is desired that the guide pin 1 is reusable more than 10 times. However, in order to ensure maximum precision in coupling, the guide pin may be disposed of after each connect/disconnect cycle.

The deformation that occurs in the member of low Young's modulus can be absorbed in two areas; first of all, guide pin hole 21 is designed to have a triangular cross section as shown in FIG. 13A and the deformation that occurs in the circumferential direction of the pin is absorbed by the three apexes 3 of the triangular cross section; secondly, a deformation 6 that occurs in the axial direction of the guide pin 1 is absorbed by the small-diameter portion 13 as shown in FIG. 13B. What is particularly important in the latter case is that the small-diameter portion 13 should be provided at the end face 5 of any one optical connector where it is to be coupled to the other connector because if the axial deformation is exerted upon this end face, the two connectors are not able to establish complete contact with each other at their respective end faces.

Figure 15A:
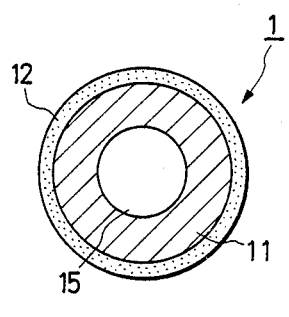
FIGS. 15A and 15B ar cross sections showing guide pins according to the present invention.
Figure 15B:
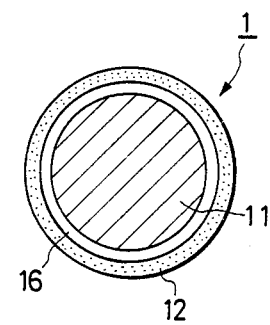

In the foregoing explanation, the core member 11 of high Young's modulus is shown as a solid member but it may be in the form of a tubular member having a hollow portion 15 as shown in FIG. 15A. Alternatively, in order to provide improved adhesion to the low-Young's modulus member 12, the core member 11 may be formed in more than one layer with an intermediate layer 16 such as a layer of a coupling agent being provided between the two members as shown in FIG. 15B.

The material of the outer layer 12 may preferably is made of a ceramics, particularly of a zirconia. The zirconia material is lower than a metallic material in Young's modulus and has hard, smooth properties to achieve precise working of the guide pin.

EXAMPLE

An example of the application of the concept of the present invention to an optical connector having an array of six coted optical fibers is described hereinafter.

Guide pins 1 were fabricated as follows: a stainless steel rod was machined to make a core member 11 having an outside diameter of 0.297 mm with a tolerance of −0.001 mm, and the core member was coated with an plastic thin film having ewual thickness (ca. 2.5 μm) of a low-Young's modulus material to provide an outer layer 12 having an outside diameter of 0.302 mm with a tolerance of −0.001 mm. Each pin was provided with three small-diameter portions 13 in its middle portion so that the central part of each small-diameter portion 13 had an outside diameter of about 0.250 mm. Each of the guide pins so fabricated had an overall length of about 7 mm and each of the small-diameter portions 13 had a length of about 0.8 mm. Both ends of each guide pin 1 were tapered as indicate by 14 to provide a tip diameter of no more than 0.2 mm. An optical connector ferrule 2 with which the guide pins were to be sued was fabricated form silicon and it was provided with triangular guide pin holes 21 as shown in FIG. 12C. The guide pin holes were precisely machined so that the inscribed circle of the triangle would have a diameter of 0.300 mm with a tolerance of 0.002 mm. Because of this dimensional relationship, the outer layer 12 of low Young's modulus in the guide pin having an outside diameter of 0.302 mm with a tolerance of −0.001 mm would undergo a deformation of 1 μm at minimum and 4 μm at maximum with respect to its diameter.

Using the guide pins 1 and the optical connector ferrule 2 described above, an optical connector for coupling six single-mode fibers in an array was fabricated and its characteristics were evaluated.

Measurements were conducted on 50 samples of guide pin and the variation in coupling loss that occurred as a result of 25 connect/disconnect cycles (N=25) was within 0.05 dB with respect to the average loss of 0.23 dB. This data shows that the coupling loss occurring in the optical connector of the present invention is consistent and independent of guide pin changes; in other words, the connect/disconnect variation which results from the clearance between the guide pin and the guide pin hole is appreciably reduced and the coupling loss that occurs in the optical connector of the present invention is largely dependent on the initial misalignment of optical fibers.

The reliability of the optical connector of the present invention was evaluated by subjecting it to a heat cycle test (−30° C. to +70° C.) for 10 days, and to a wet heat resistance test for 10 days at 60° C. and 90% rh. In either test, the connector cause a variation in coupling loss within the range of ±0.03 dB, indicating its ability to ensure consistent coupling of fibers.

The example shown above is just one embodiment of the present invention and the thickness of the layer of low Young's modulus may be reduced (<2.5 μm) or increased (>2.5 μm). However, if the thickness of the outer coating is made too thick, difficulty is encountered in controlling dimensions. Therefore, the maximum thickness of the outer layer is preferably not more than about 50 μm, which is about 10 times the deformation that is supposed to occur in an amount of 5 μm. If ultra-high precision is desired in coupling, the outer coating is preferably designed to have a thickness of no more than 5 μm for a deformation not exceeding 0.5 μm.

As described above, the optical connector of the present invention employs guide pins each of which is composed of a core member that is made of high-Young's modulus material such as a metal and an outer coating layer that is made of a thin film of a low-Young's modulus material. When these guide pins are inserted into associated guide pin holes, a small deformation is caused to occur in the low-Young's modulus member, producing a sufficient pressure to fix the guide pins in the guide pin holes. As a result, the clearance that would otherwise occur between the guide pins and the guide pin holes which are to be coupled thereto is entirely eliminated or reduced to a very small value, thereby realizing low-loss coupling of optical fibers in a consistent manner.

If the guide pin holes are rendered triangular in cross section, areas are provided for absorbing a circumferential deformation that occurs in the guide pins and the guide pins can be urged into contact with three points to ensure reliable coupling with the guide pin holes.

In the optical connector of the present invention, a small-diameter portion may be provided in the middle portion of each of the guide pins, and this small-diameter portion not only provides an area for absorbing an axial deformation that occurs in the guide pins but also ensures that two optical connectors are brought into intimate contact with each other at their end faces while producing improved adhesion between the high-Young's modulus member and the low-Young's modulus member. The step portion provide by the small-diameter portion may be used to clamp the guide pins with a jig, and this enables the guide pins to be easily disconnected or connected from the optical connector ferrule if guide pin change is required.

Figure 43:
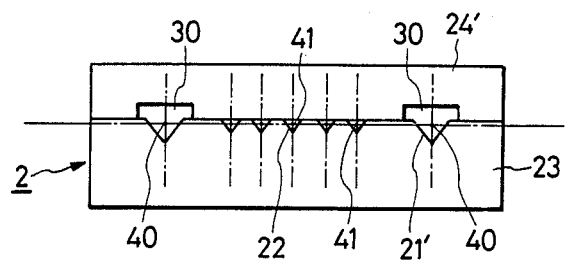
FIG. 43 is a cross section of an optical connector ferrule according to one specific embodiment of the present invention.
Figure 44A:
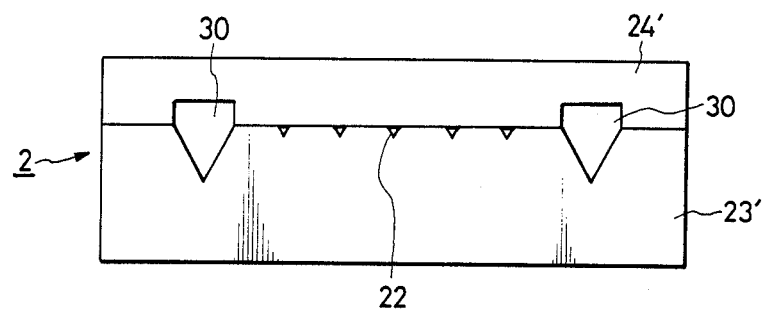
FIGS. 44A to 44C are cross section of optical connector ferrules according to other specific embodiments of the present invention.
Figure 44B:
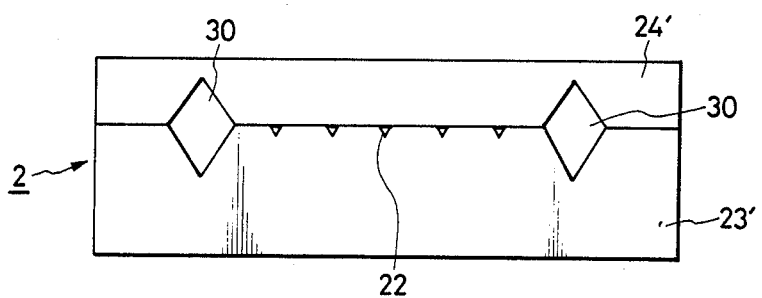
Figure 44C:
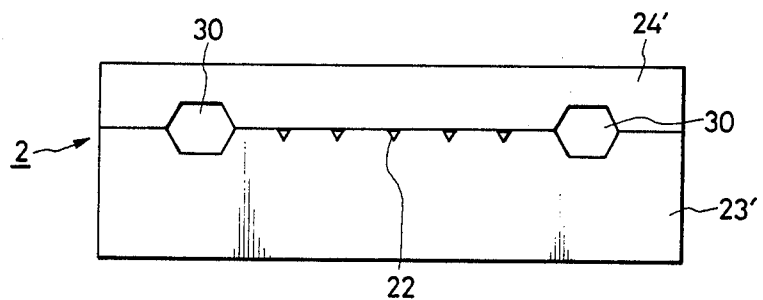

In the optical connector as shown in FIG. 12C, the V-grooved plate 23, which is provided on the top surface thereof with guide pin V grooves and optical fiber guide V grooves, is overlaid with a flat plate 24 so as to form triangular guide pin holes 21 and optical fiber guide holes 22. However, the plate 24' having grooves 30, which are located above the guide pin V grooves when the plate 23 is overlaid with the plate 24', may be used so that the inner centers 40 of the guide pin holes 21' and the inner centers 41 optical fiber guide holes 22 are arranged in alignment, as shown in FIG. 43. Further, the grooved plate 23' and the plate 24' as shown in FIGS. 44A to 44C may be used to form an optical connector ferrule, in which the guide pin is fired to the guide pin hole in contact with at least three points.

Further, in order to absort the variation in the diameter of the guide pin, the material of the cover plate may be different from that of the substrate plate in Young's modulus.

Figure 16:
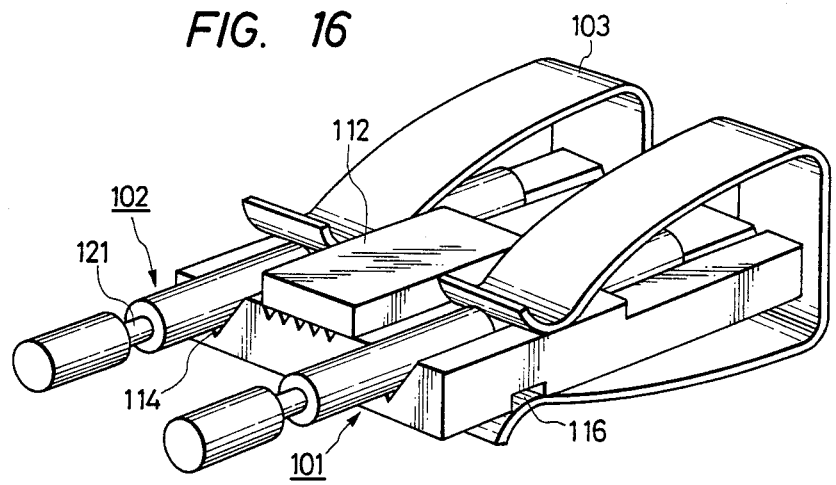
FIG. 16 is a perspective view of an optical connector according to the present invention.
Figure 17:
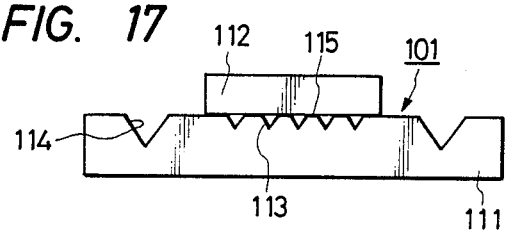
FIG. 17 is a front view of an optical fiber guide member in the optical connector of the present invention.
Figure 18:
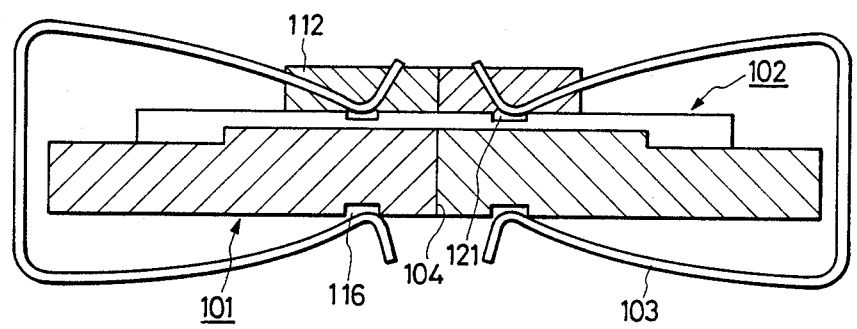
FIG. 18 is a longitudinal section of two units of the optical connector shown in FIG. 16.

FIG. 16 is a perspective view of an optical connector according to another embodiment of the present invention. FIG. 17 is a front view of an optical fiber guide member in the optical connector of the present invention. FIG. 18 is a longitudinal section of two coupled units of the optical connector shown in FIG. 16.

The construction of the optical fiber guide member 101 in the optical connector of the present invention is shown in FIG. 17; a grooved substrate 111 provided in its top surface with optical fiber guide grooves; 113 for fixing optical fibers in position and guide pin grooves 114 is overlaid with a flat plate 112 that is joined to said grooved substrate 111 with a thin layer of an adhesive 115 being interposed, and the flat plate 112 covers only the optical fiber guide grooves 113 in such a way that the guide pin grooves 114 are exposed.

As shown in FIGS. 16 and 18, two optical connectors are coupled together, with a clamper 103 having a resilient compressive force being attached from the rear end of the optical fiber guide member 101 while guide pins 102 are inserted from the front end of the guide member 101. As a result, the guide pins 102 are secured in the guide pin grooves 114 by the resilient compressive force of the clamper 103.

Each of the guide pins 102 is provided with at least two small-diameter portions 121 and that portion of the underside of the grooved substrate 111 where the small-diameter portions 121 are situated is provided with a clamping groove 116 that runs in a direction perpendicular to the axial direction of each guide pin 102. The pressure-applying portions of the clamper 103 serve to compress and fix the guide pins 102 in position, with one pressure-applying portion being situated in the small-diameter portions of the guide pins 102 while the other pressure-applying portion is situated in the groove 116 on the underside of the grooved substrate 111.

The width of the clamper 103 is made equal to or slightly greater than the width of the grooved substrate 111 of the optical fiber guide member 101, and the height of the clamper 103 is so set that its maximum dimension is greater than the height of the optical fiber guide member 101.

Figure 19:
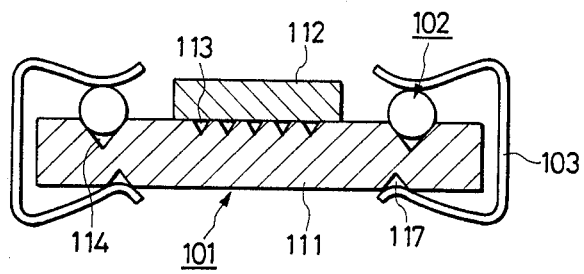
FIG. 19 is a cross section of an optical connector according to the present invention.

FIG. 19 is a cross section of an optical connector according to a further embodiment of the present invention. In this embodiment, the clamper 103 is divided into two separate members which are so constructed that they can be connected or disconnected from the lateral side of the optical fiber guide member 101. In this case, clamping grooves 117 are formed on the grooved substrate 111 in such a way that they run parallel to the axial direction of the guide pins 102, and the clamper 103 is provided with a projection where it contacts each of the small-diameter portions 121 of a guide pin, so that said projection is situated in the associated small-diameter portion 121 of a guide pin.

In the optical connector of the present invention, the guide pin grooves 114 in the optical fiber guide member 1 are not covered with the flat plate 102 and are directly exposed to the outside. Therefore, guide pins 102 inserted into these grooves 114 will be supported by means of contact at only two points of each groove 114 and the upper side of each guide pin 102 which contacts the clamper 103 is compressed toward the bottom of the groove 114 so that it can be fixed therein. In this connection, it should be emphasized that since the clamper 103 is capable of elastic deformation, any slight variation in the diameter of guide pins can be effectively absorbed by the elastic deformation of the clamper 103. In practice, a variation of about 0.1 mm in the guide pin diameter from a prescribed value of, say, 0.7 mm can be completely absorbed by the clamper without any difficulty and even a guide pin having a diameter of 1.0 mm could be effectively inserted into a guide pin groove. As a further advantage, two optical connectors can be coupled together without any difficulty even if the two guide pins used have slightly different diameters.

In the optical connector of the present invention, guide pins 102 are compressed toward the bottom of guide pin grooves 11 by means of clamper 103 and this has the advantage that if an external force is applied to the guide pins 102, the stress will not be transmitted to the grooved substrate 111 but instead will be absorbed by the deforming clamper 103. In order to attain this result, the clamper 103 must deform elastically to absorb the stress acting on the guide pins 102 before it is exerted on the grooved substrate 111 to damage part of it. The resilient compressive force of the clamper 103 can be easily adjusted by changing the material or thickness of the clamper and it is easy to set a value that accommodates the stress tolerated by the grooved substrate 111 before it fails.

Another feature of the optical connector of the present invention is that the small-diameter portions of each of the guide pins 102 that are held in position by the clamper 103 are in registry with the clamping groove 116 in the grooved substrate 111. This feature is effective in reducing the slippage that might occur between the guide pins 102 and the grooved substrate 111 and because of this anti-slip effect, resistance is provided against the force that acts to pull apart coupled optical connectors, thereby enhancing the reliability of coupling of two connectors. This resistive force against separation between connectors is dependent upon the force of friction between the guide pins 102 and the groove substrate 111 and enhanced friction can be easily produced either by increasing the compressive force of the clamper 103 or by roughening the surface of the guide pins. An experiment has shown that optical connectors fabricated according to the present invention can withstand a pulling force of up to 2.8 kg without causing slippage between the guide pins and the grooved substrate. They could theoretically be improved to withstand a pulling force of up to 4–5 kg and for practical purposes, a strength that withstands a pulling force of about 2 kg would be sufficient to ensure reliable operation of coupling two optical connectors.

In a preferred embodiment of the present invention, the clamper 103 has such dimensions that its width is equal to or greater than the width of the grooved substrate 111 and that its maximum height is greater than the height of the optical fiber guide member 101, and the clamper having these dimensions serves to protect the optical fiber guide member 101 against any external force such a impact that is exerted upon the optical connector. In particular, in the case where the grooved substrate 111 and the flat plate 112 are made of a hard and brittle material such as silicon, the clamper 103 will serve a an effective protector against nicking of the silicon material upon application of impact.

As described above, the clamper used in the optical connector of the present invention is responsible for a great variety of actions and the optical connector adopts an optical fiber guide member and guide pins that are constructed to elicit such actions from the clamper in an effective and efficient manner.

EXAMPLE

An optical connector having the construction shown in FIG. 16 was fabricated. The grooved substrate and the flat plate of this connector were made of silicon, and optical fiber guide grooves and guide pin grooves were formed in the top surface of the substrate by a cutting operation. In the optical connector sample fabricated in this example, twelve optical fiber guide grooves were formed at a pitch of 0.25 mm. The guide pins used with this optical connector had a diameter of 0.7 mm and were each provided with small-diameter portions having a diameter of 0.4 mm. As shown in FIG. 16, the clamper was so designed that it could be connected or disconnected from the rear end of the optical fiber guide member whereas the guide pins were capable of insertion from the front end of the guide member. A clamping groove was formed in the underside of the grooved substrate in such a way that it ran perpendicularly to the axial direction of each guide pin. The pressure-applying portions of the. clamper were situated both in the clamping groove and in the small-diameter portions of the guide pins so that they would compress and fix the guide pins in position.

The optical connector of the present invention described above affords the following advantages.

(1) A clamper capable of elastic deformation is positioned over guide pin grooves, so the stress that is exerted upon the grooved substrate by guide pins when they are inserted into guide pin grooves is absorbed by the clamper to protect the grooved substrate.

(2) Since the clamper deforms elastically when guide pins are inserted into guide pin grooves, any variation in the diameter of guide pins can be effectively absorbed by the clamper so that two optical connectors can be coupled together without any difficulty. Furthermore, the diameters of two guide pins that are to be inserted into the guide pin grooves on both lateral sides of the optical fiber guide member need not be equal to each other and this eliminates the need to perform strict control over the diameter of guide pins for use with the optical connector of the present invention.

(3) The clamper is held in position by both the groove formed in the underside of the grooved substrate and the small-diameter portions of each guide pin. This is effective in reducing the slippage that might occur between the guide pins and the guide pin grooves, and resistance is provided against the force that acts to pull apart coupled optical connectors, thereby ensuring reliable coupling of two connectors.

(4) The clamper is designed to have larger dimensions than the optical fiber guide member, so it has a capability of protecting the optical fiber guide member against damage.

(5) Each of the guide pins used in the optical connector of the present invention is provided with small diameter portions, which serve a grips for the guide pins and permit them to be easily inserted into guide pin grooves of readily extracted the refrom.

Figure 20A:
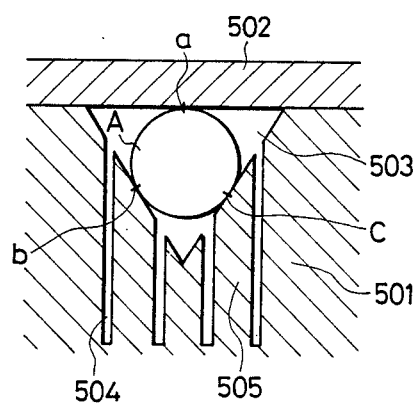
FIGS. 20A, 20B and 21 are cross sections of a wire material positioning member according to the present invention.
Figure 20B:
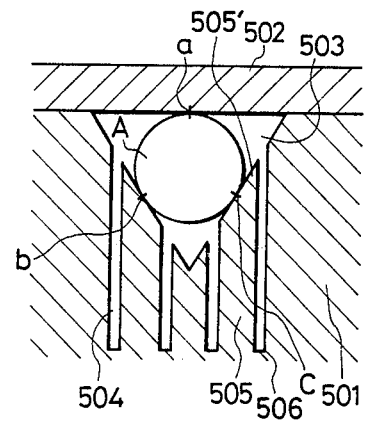

FIG. 20A is a cross section of a wire material positioning member according to one specific embodiment of the present invention as it is seen from the front side. The wire material positioning member is composed of a grooved substrate 501 having V grooves formed on its top surface and a flat holding plate 502, which are joined to form guide holes 503 in the interior of the assembly through which a wire material (A) is to be inserted. Each of the guide holes 503 is provided with four slits 504 that run substantially parallel to the axis of the guide hole 503 and which communicate with the same guide hole 503. The wire material (A) inserted into the guide hole 503 makes contact with the all of the guide hole at three points (a), (b) and (c). A the lower points (b) and (c), the wire material (A) also makes contact with part of the two beams 505 that are defined by the four slits 504. Therefore, even if the outside diameter of the wire material (A) is slightly greater than the diameter of the circle that is internally tangent on the guide hole 503, the beams 505 that come in contact with the wire material will deform as shown in FIG. 20B, thereby allowing it to be smoothly inserted into the guide hole 503. In other words, the slits 504 permit the wall of the guide hole 3 to partly undergo elastic deformation and absorb any slight variation in the diameter of the wire material (A), thereby ensuring three-point supporting of the wire material without leaving any clearance from the guide hole 503.

If desired, the bottom of each slit 504 may be rounded so as to inhibit the occurrence of cracking in this area. According to the present invention, slits 504 are provided either in a guide hole 503 or in the vicinity of this hole and the presence of such slits might deteriorate the overall strength of the positioning member. In particular, the beams 505 which are subject to a large amount of deformation might be affected by a bending stress that is exerted upon the base of the beams 505, or the vicinity of the bottom of slits 504. If a tiny initial crack occurs in this area during machining, it will later develop to a large crack that may eventually destroy the beams 505. Therefore, by rounding the bottom of each slit 504, the occurrence of initial cracking can be prevented to improve the overall strength of the positioning member.

Figure 21:
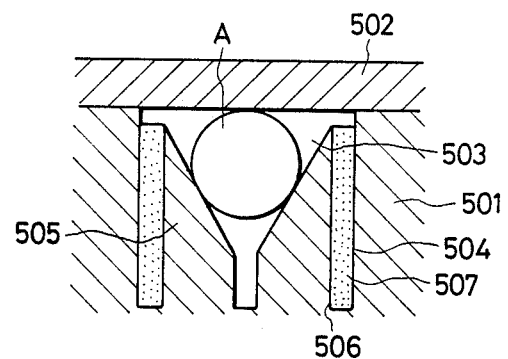

FIG. 21 is a cross section of a wire material positioning member according to another specific embodiment of the present invention as it is seen from the front side. As shown, some of the slits 504 are filled with a material 507 that has a different elasticity than the material of which the positioning member is made. This embodiment is effective for the purpose of changing the elastic strength of the beams 505. If an external force such as a bending stress is exerted upon the wire material (A) inserted into the guide hole 503, the stress will be propagated to the wall of the guide hole 503 but part of the transmitted stress is absorbed by the elastic deformation of the beams 505. In addition, the strength of the beams can be adjusted by the material 507 filled in the lists 504. Therefore, according to the embodiment shown in FIG. 21, the positioning member is capable of withstanding an external force without breaking and yet the beams can be adjusted to have a capability of undergoing an adequate amount of deformation.

Figure 3:
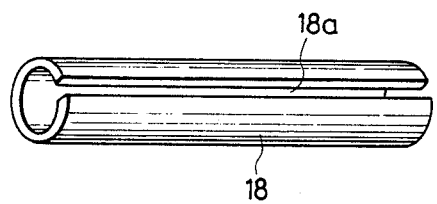
FIG. 3 is a perspective view showing an elastic slit pipe used as a guide pin.
Figure 22:
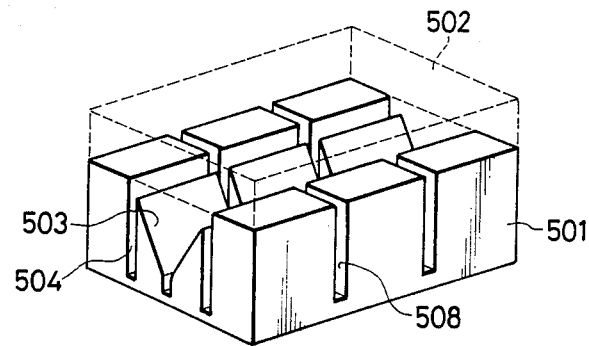
FIG. 22 is a perspective view of a wire material positioning member according to the present invention.

FIG. 22 is a perspective view of a wire material positioning member according to still another embodiment of the present invention. In addition to filling some slits with a certain material 507 as in the embodiment shown in FIG. 21, the strength of the beams 505 can also be adjusted by providing an additional slit 508 in a direction substantially perpendicular to the axis of the guide holes 503 as shown in FIG. 3. If more than one slit 08 is provided, the strength of the beam 505 that is present between adjacent slits 508 is determined by the distance from one slit 508 to another. Therefore, the slits 508 are also effective for the purpose of easily adjusting the strength of the beams 505.

EXAMPLE

Figure 23:
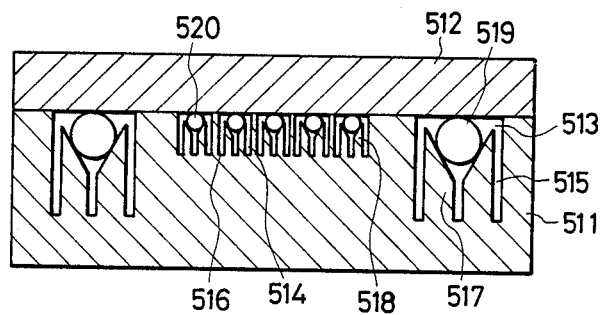
FIG. 23 is a multi-fiber optical connector showing one example of the applications of the wire material positioning member of the present invention.

FIG. 23 shows a multi-fiber optical connector which is one example of the application of th wire material positioning member of the present invention.

The groove substrate 511 and the holding plate 512, which are the two principal components of the multi-fiber optical connector, are each made of silicon which, because of its hard and brittle nature, will not readily deform under external force. In the body of the connector, two guide pin holes 513 and five optical fiber guide holes 514 are formed, and guide pins and optical fibers are inserted into these guide holes 513 and 514, respectively, so that they can be fixed in position in these holes. Each of the guide holes 513 is provided with three slits 515 to define two beams 517 and each of the guide holes 514 is also provided with three slits 516 to define two beams 518. The guide pins 519 have an outside diameter of 0.35 mm and the optical fibers 520 have an outside diameter of 0.125 mm. The guide holes 513 and 514 are so designed that their inside diameters are smaller by a very small amount than the dimensions that permit free insertion of the guide pins 519 an optical fibers 520, respectively. The guide pins and optical fibers used in practice have tolerances for their outside diameters but these tolerances are on the order of ±2 μm, which can be easily absorbed by the elastic deformation of part of the wall of the guide holes, namely, the beams 517 and 518. Therefore, the optical connector shown in FIG. 23 as the advantage that all of the guide pins and the optical fibers can be reliably supported at three points without leaving any clearance from the guide holes.

In the example described above, silicon which is extremely resistant to deformation is used as the material of the wire material positioning member and if the guide holes were not provided with any slit a sin the prior art, it would be entirely impossible for them to permit the insertion of a wire material whose outside diameter exceeds the inside diameter of these holes no matter how small the difference may be. However, the wire material positioning member of the present invention has n difficulty in absorbing a difference on the order of 2-3 μm and even a hard material like silicon becomes capable of undergoing a certain amount of deformation because of the provision of beams, thereby reducing the clearance between guide holes and the wire material to the smallest possible level. Compared with a prior art multi-fiber optical connector that had guide holes without slits and which produce an average coupling loss of 0.38 dB (on single-mode fibers), the multi-fiber connector of the present invention achieved an average coupling loss of 0.18 dB, and this demonstrates the fact that highly precise positioning can be accomplished by the present invention.

It should be noted that the position of the slits to be provided in the wire material positioning member of the present invention is by no means limited to part of the wall of guide holes and the slits may be provided in any area in the vicinity of guide holes so long as the lists define beams that are capable of undergoing a small amount of deformation. Other parameters of slits, such as their number, width and depth, may also be set to any desired values.

Figure 24A:
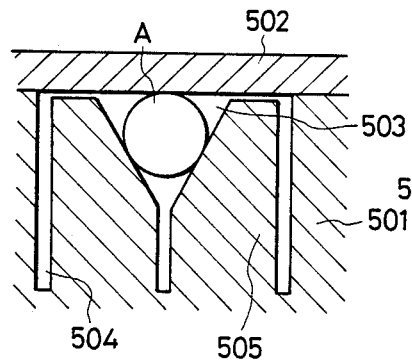
FIGS. 24A to 24E show various slit configurations that can be employed in the present invention.
Figure 24B:
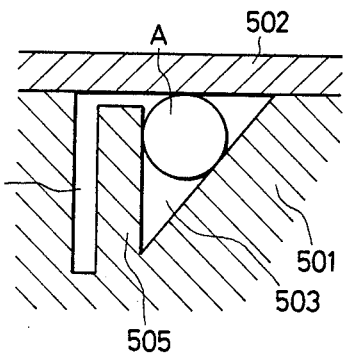
Figure 24C:
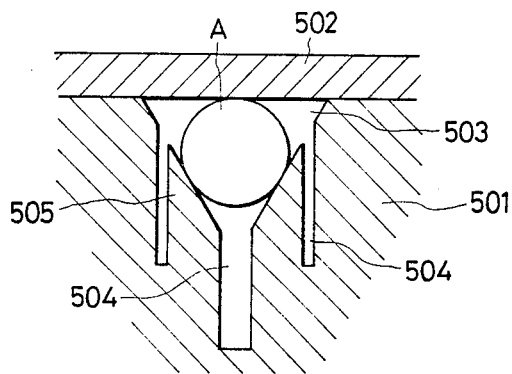
Figure 24D:
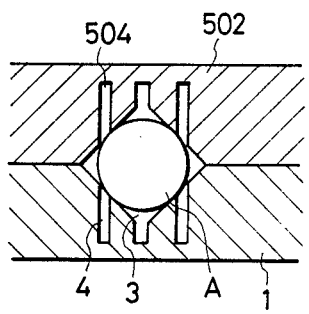
Figure 24E:
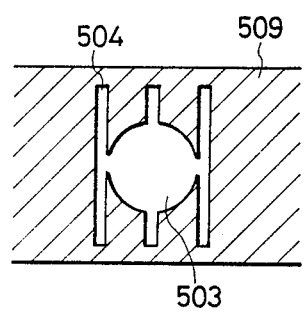

FIGS. 24A to 24E show various slit configurations that can be employed in the present invention. In FIG. 24A, two slits 504 are provided distant form the guide hole 503. In FIG. 24B, a single slit 504 is provided distant form an asymmetric guide hole 503. FIG. 24C shows the case where slits 504 having different depths and widths are provided. In the case shown in FIG. 24D, slits 504 are provided not only in the wall of a guide hole 503 but also in the holding plate 502 over said guide hole so as to provide greater ease for absorbing the variation in the diameter of the wire material (A) to be inserted into the guide hole. In the case shown in FIG. 24E, silicon is replaced by a resin 509 such as an epoxy resin and a guide hole 503 and slits 504 are formed by molding.

Figure 25:
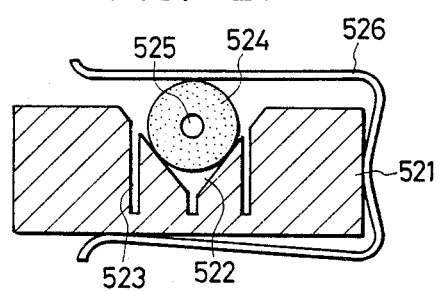
FIG. 25 is a cross section showing the wire material positioning member of the present invention.

FIG. 25 is a cross section showing another example of the application of the wire material positioning member of the present invention as it is seen form the front side. In this example, the positioning member is applied to an optical connector ferrule 524 in a single-fiber optical connector. Two optical connector ferrules 524 that about against each other are positioned on a grooved substrate 521 having formed therein a V groove 522 with slits 523 and are secured with a clamper 526. In FIG. 25, the numeral 525 signifies an optical fiber fixed in position in each of the optical connector ferrules 524.

Figure 45:
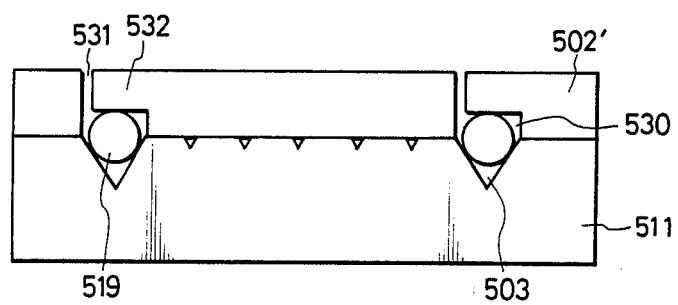
FIGS. 45 and 46 are cross sections showing an optical connector according to other examples of the present invention.
Figure 46:
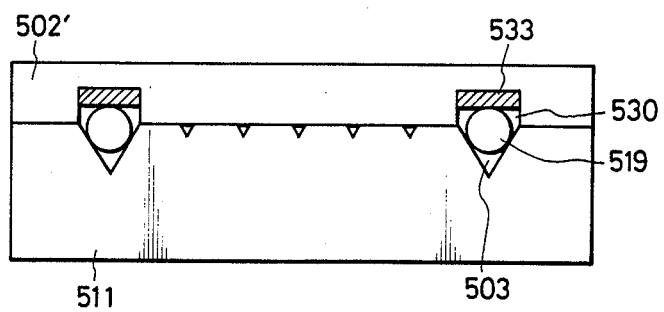

Further, FIGS. 45 and 46 is cross sections showing other specific embodiments of the present invention.

In FIG. 45, a holding plate 502' is used to support the wire material 519 without leaving any clearance from the guide hole 503. The holding plate 502' is provided with a groove 530 into which the wire material 519 is inserted, and a cut portion 531 which is provided in the groove 530. The groove 530 and the cut portion 531 extend in the longitudinal direction of the guide hole 503 provided in the groove substrate 511.

An extrusive portion 532 will deform thereby allowing the wire material 519 to be smoothly inserted into the guide hole 503 and to be supported without leaving any clearance from the guide hole 503.

In FIG. 46, a groove 530 which is formed in the holding plate 502' is provided with an elastic material 533 which allows the wire material 519 to be fixed in the guide hole 503 in a position. In the embodiments described above, the elastic material is supported by the inner wall of the guide hole with at least three points.

In the above described embodiments, the material of the guide pin may be preferably made of ceramics, particularly of zirconia. The zirconia is tougher than alumina, and the outer diameter of the crystal thereof is not larger than 0.5 μm so that the surface thereof is smooth and slidable.

Further, according to the present invention, at least one of the substrate and the holding plate may be made of silicon, ceramics or plastics, in which the former may be different from the latter in material The wire material positioning member of the present invention offers the following advantages.

(1) Even a wire material that is slightly larger than the inside diameter of a guide hole can be inserted into that hole since the wall of the latter has the ability to deform. Any stress that is externally exerted upon the wire material that has been inserted into the guide hole can be relieved as a result of slight deformation that occurs in the wall of the guide hole.

(2) If a positioning member is made of a hard and brittle material such as silicon, said member is highly prone to be nicked around the receiving edge of a guide hole when a wire material is being inserted into that hole. This problem is greatly mitigated in the positioning member of the present invention since the wall of a guide hole is capable of deforming in response to the insertion of a wire material.

(3) The strength by which the wall of a guide hole can withstand deformation without breaking can be easily adjusted by various methods such as filling slits in the wall of a guide wall with a material that has a different elasticity than the material of which the positioning member is made, or changing the depth or width of the slits, or providing additional slits in a direction substantially perpendicular to the axis of the guide hole.

(4) If the bottom of slits is rounded, they are rendered sufficiently resistant to cracking to prevent the failure of the positioning member.

Figure 26:
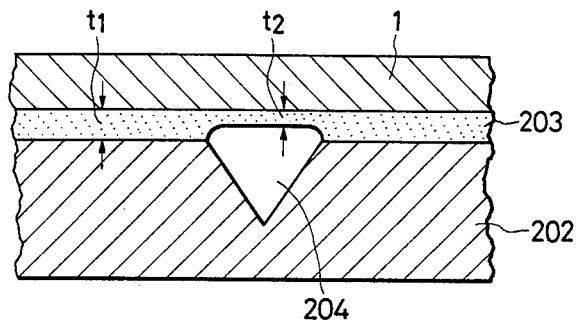
FIGS. 26 and 27 are cross sections showing an area in the vicinity of a optical fiber guide groove in an optical fiber coupling member according to the present invention.

FIG. 26 is a cross section showing an area in the vicinity of an optical fiber guide groove in an optical fiber coupling member according to one specific embodiment of the present invention. As shown, the thickness, $t_2$, of a layer of an adhesive material 203 that joins the plate 201 to the grooved substrate 202 and which is situated over an optical fiber guide groove 204 is rendered smaller than the thickness, $t_1$, of the same layer in the other areas by some chemical or physical means. One method for attaining this result is as follows: a resist such as one that is employed in a lithographic step in IC fabrication is used as an adhesive material and a resist-dissolving liquid remover is permitted to flow into the groove 204 so as to etch away the resist layer over the groove 204.

Further, in the embodiment of FIG. 26, the adhesive material 203 having an elastic material will be preferably used as the adhesive material 203' in order to prevent the variation of the guide pin in position.

Figure 27:
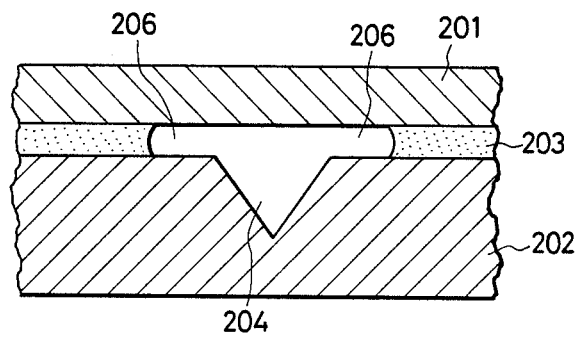

FIG. 27 is a cross section which, like FIG. 26, shows an area in the vicinity of an optical fiber guide groove in an optical fiber coupling member according to another embodiment of the present invention. In this embodiment, an unwanted portion of the adhesive layer 203 that is not responsible for joining the plate 201 to the grooved substrate 202 is removed to the extent that will not impair the strength of adhesion between the two members.

The construction shown in FIG. 26 is effective in avoiding the problem associated with the prior art technique, namely, the problem that an optical fiber having a predetermined outside diameter cannot be smoothly inserted into an optical fiber guide groove 204 on account of the layer of an adhesive material 203 that protrudes partly into the groove 204. By adjusting the thickness of the adhesive layer situated over the groove 204, the height of the space in the groove 204 can be controlled over a certain range, and this is effective in facilitating the operation of optimizing the height of the space in the groove 204 to attain a value that is best suited for the outside diameter of the optical fiber to be inserted into that groove.

In the construction shown in FIG. 27, no adhesive layer is present over an optical fiber guide groove and this is effective for the purpose of preventing dust particles and other foreign matter from being deposited in that area. As a result, the formation of high and low spots in the wall of the groove 204 due to dust buildup is reduced and an optical fiber can be smoothly inserted into that groove without getting stuck in the groove.

Conventionally, the cross-sectional profile of an optical fiber guide hole is measured and the position of the hole determined by launching transmissive light parallel to the longitudinal direction of the groove and by projecting at the exist end the profile of the groove produced by the transmitted light. If dust particles are present in part of the wall of the groove, the shape of the dust particles will be directly projected to produce an inaccurate groove profile. However, the deposition of dust particles in the groove is minimized in the construction shown in FIG. 27 and the profile o the groove can be measured with high precision.

If desired, the adhesive layer 203 in the area where the plate 201 is joined to the grooved substrate 202 may be removed as indicated by 206 in FIG. 27 to tee extent that will not impair the strength of adhesion between the two members. In this embodiment, if an optical fiber is inserted into the groove 204 and fixed with an adhesive agent in a subsequent step, the adhesive agent also fills the space 206 left after the removal of the adhesive layer 203, thereby increasing the area over which the plate 201 is bonded to the grooved substrate 202 and further enhancing the strength of adhesion between these member. The "adhesive agent" mentioned hereinabove is used to fix the optical fiber in the groove 204 and provides a greater strength of adhesion than the "adhesive material" used to join the plate 201 to the grooved substrate 202.

EXAMPLE

Figure 28:
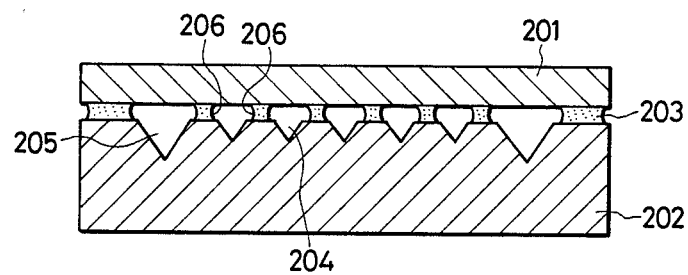
FIG. 28 is a cross section of an optical connector according to the present invention.

FIG. 28 is a cross section of an optical connector which is one example of the application of the optical fiber coupling member of the present invention.

The layer of an adhesive material 203 provide in this connector had a thickness of about 1 $\mu$m. In order to form such a thin adhesive layer, the adhesive material is required to have a fairly low viscosity. In this example, the adhesive layer 203 was formed of a resist such as one that is employed in a lithographic step in IC fabrication. The plate 201 was a silicon plate having a thickness of 0.5 mm and the grooved substrate 202 was also a silicon plate having a thickness of 1.5 mm.

The connector fabricated in this example had optical fiber guide grooves 204 into which optical fibers were to be inserted and guide pin grooves 205 into which guide pins were to be inserted. The adhesive layer 203 was entirely removed form the area over these grooves 204 and 205. As already mentioned, the adhesive layer 203 was formed of a resist, so it was removed by heating the assembly at about 130° C. for 2–3 minutes after a liquid resist remover was poured into the grooves 204 and 205. The resist layer, which had a thickness of only about 1 $\mu$m, could be readily dissolved in a short period of time.

The resist inherently has no great capability of working as an adhesive agent and it produces a smaller strength of adhesion than ordinary adhesive agents. However, the joint between the plate 201 and the grooved substrate 202 can be guaranteed for practical purposes by filling the gap between an optical fiber and an optical fiber guide groove 204 with a more effective adhesive agent (having a greater strength of adhesion than the resist) when the fiber is inserted into that groove 204.

ADVANTAGES OF THE INVENTION

As described above, in the optical fiber coupling member of the present invention, the layer of an adhesive material is made thinner in areas over optical fiber guide grooves than in the other areas. By adjusting the thickness of this adhesive layer, even optical fibers having some variation in outside diameter can be inserted and fixed in optical fiber guide grooves without producing an increased clearance.

Alternatively, the layer of an adhesive material is entirely removed from areas over the optical fiber guide grooves and this is effective for the purpose of preventing the deposition of dust particles and other foreign matter in the grooves. Since this reduces the formation of high and low spots in the wall of the grooves due to dust buildup, optical fibers can be easily inserted into the grooves and at the same time, the profile of individual grooves can be precisely determined by using transmitted light.

If desired, even the area of interface between the plate and the grooved substrate may be provided with some open space where no of an adhesive material layer is present and in this case, the bond between the plate and the grooved substrate can be further enhanced by filling said space with a material producing a greater strength of adhesion than said adhesive material when optical fibers are inserted into the grooves in a subsequent step.

FIGS. 29A to 29D illustrate an optical fiber coupling member according to a still further embodiment of the present invention.

Figure 29A:
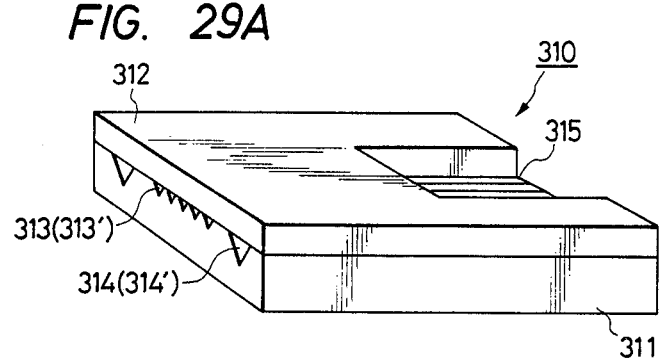
FIG. 29A is a perspective view of an optical fiber coupling member according to the present invention.
Figure 29B:
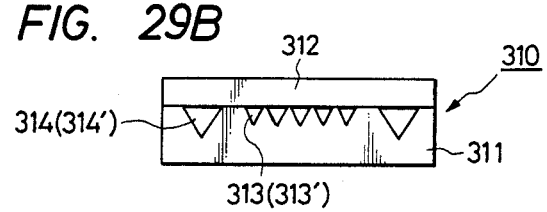
FIG. 29B is a cross section of an optical fiber coupling member shown in FIG. 29A.
Figure 29C:
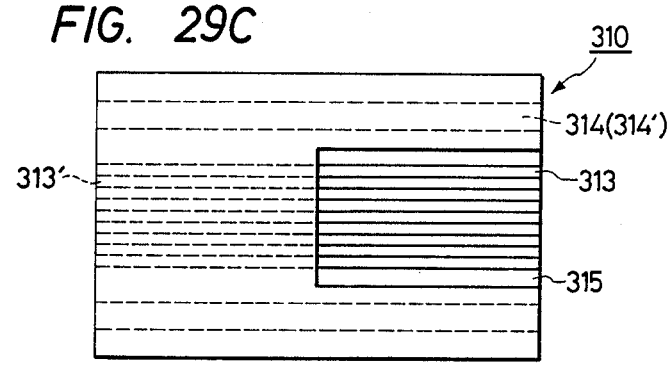
FIG. 29C is a top view of the optical fiber coupling member shown in FIG. 29A.
Figure 29D:
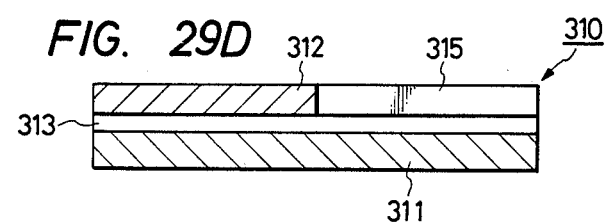
FIG. 29D is a side view of the optical fiber coupling member shown in FIG. 29A.

As shown in FIGS. 29A and 29B, a cover plate 312 placed on top of a grooved substrate 311 that has optical fiber guide grooves 313 and guide pin grooves 314 formed in its top surface is heated at a elevated temperature without employing any adhesive agent so as to produce a unitary assembly which has optical fiber guide holes 313′ and guide pin holes 314′ formed in its interior. A cutout 315 is formed in the rear portion of the cover plate 312 in such a way that part of the optical fiber guide grooves 313 becomes exposed to facilitate subsequent insertion of optical fibers.

The grooved substrate 311 is joined to the cover plate 312 in the following manner. The surfacer of the two members at which they are to be joined together are ground and polished to high dimensional precision and direct bond is temporarily established by wringing; the combination is then heated to an elevated temperature, say, 1,000° C. or more so that any impurities, water and other unwanted matter present at the interface between the two members are evaporated to activate their surfaces to such an extent that they are directly bonded together into a unitary assembly. As will be described later in this specification, two large plate units, say, wafers may be employed, one wafer being a grooved wafer that has a plurality of optical fiber guide grooves formed by machining, and the other being a cover plate wafer. If these two wafers are bonded by the method described above and are subsequently cut into discrete chips, a number of coupling members in a chip form can be produced simultaneously.

Since optical fiber guide holes 313′ are already present in the optical fiber coupling member 310 of the present invention, an optical connector or a mechanical splicer can be produced by simply inserting and fixing optical fibers in these guide holes without requiring any difficult assembly operations as in the prior art.

Figure 30A:
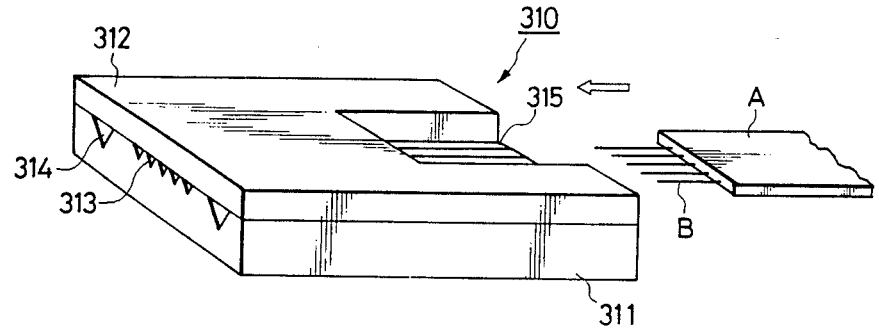
FIGS. 30A to 30C show the sequence of procedures for fabricating an optical connector using the optical fiber coupling member shown in FIGS. 29A and 29B.
Figure 30B:
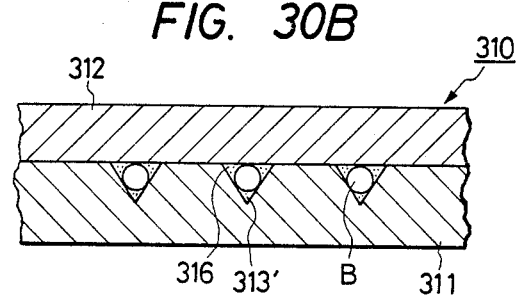
Figure 30C:
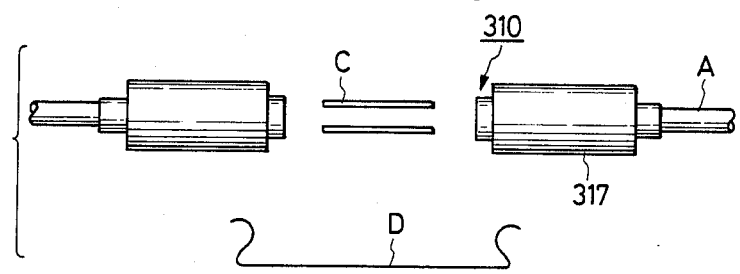

FIGS. 30A to 30C show the sequence of procedures for fabricating an optical connector using the optical fiber coupling member shown in FIGS. 29A and 29B. First, as shown in FIG. 30A, the optical fibers (B) in a fiber array (A) are inserted into optical fiber guide holes 313′ from the cutout 315 in the rear portion of the cover plate 312 of the coupling member 310; then, as shown in FIG. 30B, the optical fibers (B) are fixed in the guide holes 313′ with an adhesive agent 316; thereafter, as shown in FIG. 30C, the coupling member 310 is accommodated in a housing 317 and two units of such coupling member are positioned in a face-to-face relationship, with guide pins (C) being inserted into the guide pin holes 314′ in each coupling member in such a way that the two coupling members are coupled together. The coupled members are finally secured with a clamper (D).

FIGS. 31A to 31F show the sequence of procedures for producing the optical fiber coupling member of the present invention on a commercial scale.

Figure 31A:
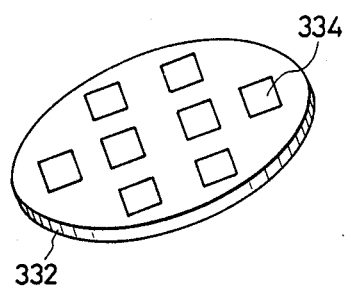
FIGS. 31A to 31F show the sequence of procedures for producing the optical fiber coupling member of the present inventions.
Figure 31B:
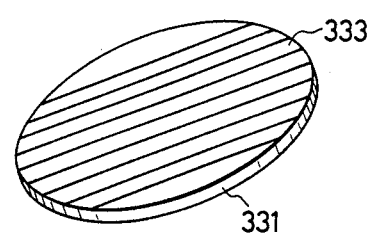

First, a cover plate wafer 332 that may be made of silicon and which, as shown in FIG. 31A has a plurality of rectangular windows 334 is provided. Also, a grooved silicon wafer 331 which, as shown in FIG. 31B, has a plurality of optical fiber guide grooves 333 formed by machining is provided. The surfaces of the two wafers at which they are to be joined together are ground and polished to high dimensional precision and are temporarily bonded by wringing. Thereafter, the combination is heated to a temperature of, say, 1,000° C. and upward to activate the mating surfaces in such a way that the two wafers are strongly bonded together into a unitary assembly without using any adhesive agent (see FIG. 31C).

Figure 32A:
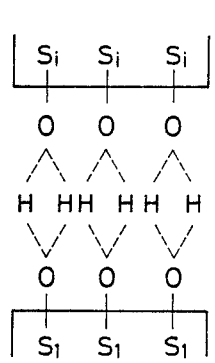
FIGS. 32A to 32C illustrate a technique for establishing direct silicon-to-silicon bonding.
Figure 32B:
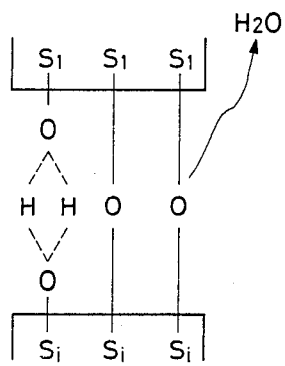
Figure 32C:
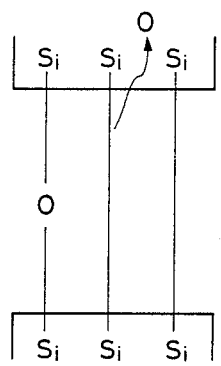

For the theory of direct silicon-to-silicon bonding, see, for example, Denki Joho Tsushin Gakkai-shi (in Japanese), vol. 70, No. 6, p. 593–595, June 1987, which states as follows: "The surface of a silicon oxide film has OH groups that have been formed as a result of reaction with water. The surface of silicon is in the same state since it has a spontaneously formed oxide film present. If these OH groups are activated and brought into direct contact, hydrogen bonds will be formed" (FIG. 32A). Upon further heating, the OH groups will undergo dehydrative condensation to produce Si—O—Si bonds (FIG. 32B). If the oxide film present in silicon-to-silicon bonding is extremely thin, oxygen will diffuse into the bulk of silicon, thereby forming Si—Si bonds (FIG. 32C).

As discussed above, silicon in its usual state has impurities and water adsorbed on its surface and silicon-to-silicon bonding is inhibited by such adsorbates. If silicon is heated to an elevated temperature of, say, 1,000° C. and upward, the adsorbates are evaporated to provide an activated silicon surface. However, this process will not work effectively for a large surface area to be bonded because it generally does, not have any passage for evaporation of the adsorbates. But in the present invention, the grooved wafer has a number of optical fiber guide grooves formed in its surface and it may be provided with additional grooves that run across it for the specific purpose of providing channels for evaporation. In addition, the cover plate wafer is provided with a plurality of rectangular windows. These grooves and windows will combine together to contribute to efficient bonding of the two wafers.

In the manner described above, the grooved wafer 331 and the cover plate wafer 332 are joined into a unitary assembly 335. Then, as shown in FIG. 31F, the assembly is cut both in a direction 337 that is perpendicular to the optical fiber guide grooves 333 and in a direction 336 parallel said grooves, thereby producing a number of optical fiber coupling members 310 in a chip form as shown in FIG. 31E. In this case, cutting in the direction 337 which is perpendicular to the optical fiber guide grooves 333 results in traversing the centers of the windows 334 in the cover plate wafer 332, so this cutting operation will simultaneously produce a cutout 315 in the rear portion of each cover plate 312.

Figure 4:
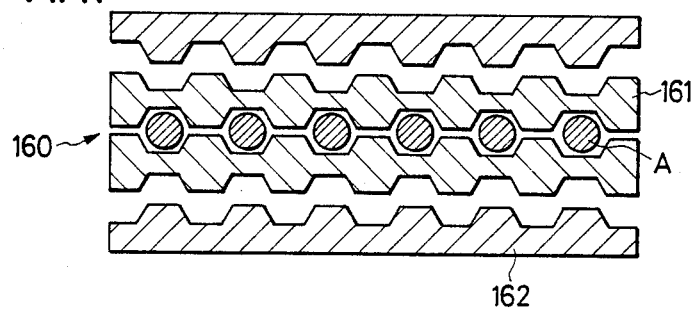
FIG. 4 is a sketch showing the prior art optical connector.
Figure 5:
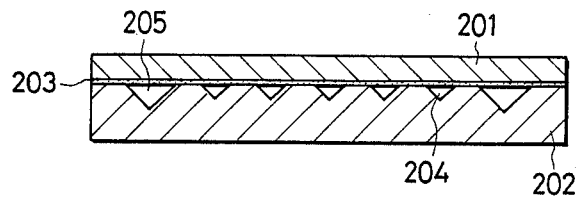
FIG. 5 is a cross section showing an example of the prior art optical connector.
Figure 6:
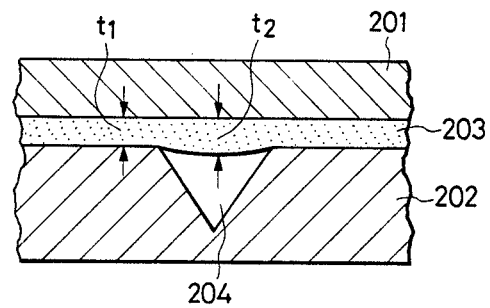
FIG. 6 shows diagrammatically the problem associated with the prior art optical connector.
Figure 7:
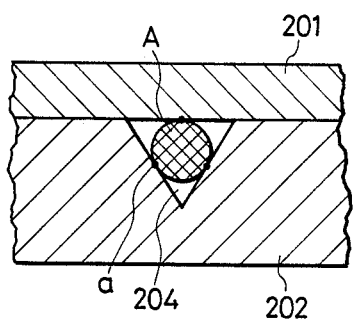
FIGS. 7 and 8 illustrate how the optical fiber is positioned in the optical connector.
Figure 8:
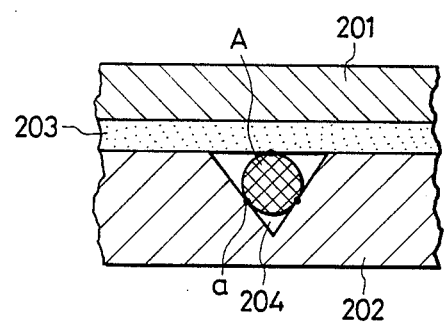
Figure 9A:
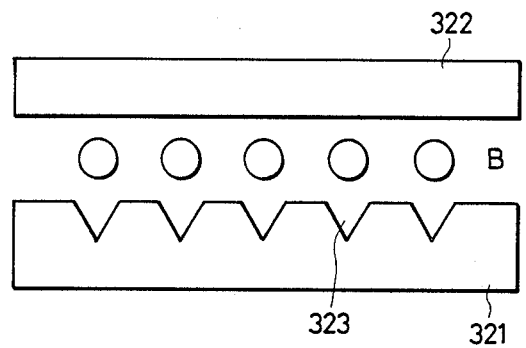
FIGS. 9A and 9B illustrate one example of the prior art optical connector.
Figure 9B:
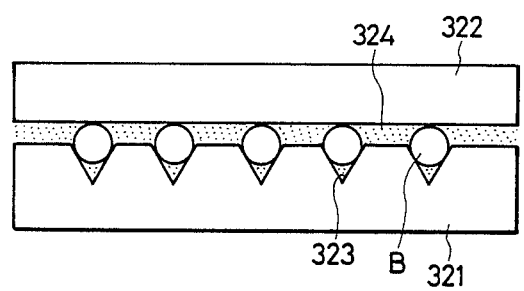
Figure 10A:
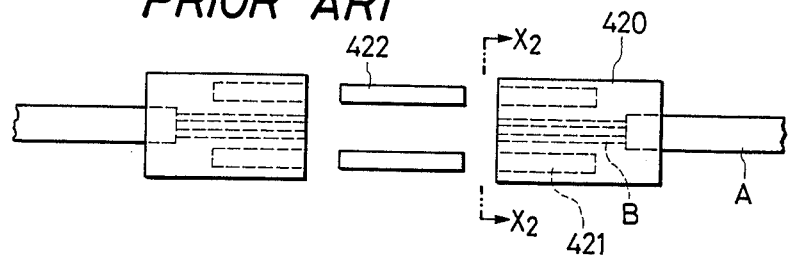
Figure 10B:
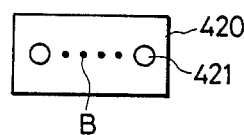
Figure 10C:
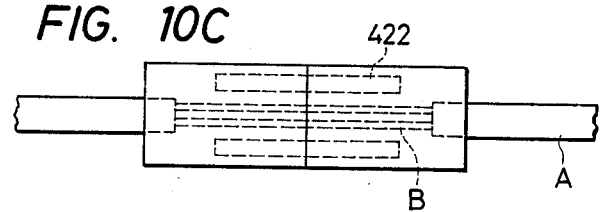

After obtaining the discrete chips of optical fiber coupling member 310, the optical fibers in a fiber array (A) are fixed in position in the optical fiber guide holes 313′. The individual chips are then accommodated in a housing 317 to make optical connectors a shown in FIG. 4(f).

EXAMPLE

Two silicon wafers were ground and polished to provide a specular surface. One of these wafers was provided with a continuous pattern of V-shaped optical fiber guide grooves and guide pin grooves. These guide grooves were made with the same cutting wheel except that the depth of the optical fiber guide grooves was different from that of the guide pin grooves. Cutting is just one example of the method of machining silicon wafers and the same result can be attained by either etching or molding. V-shape, either. Both the optical fiber guide grooves the guide pin grooves were V-shaped with an angle of about 60° and precision-machined to an accuracy of 0.1 μm so that they would accommodate inscribed circles having diameters of 0.125 mm and 0.500 mm, respectively. The optical fiber guide grooves had a pitch of 0.25 mm and were six in number, whereas the two guide pin grooves had a pitch of 5 mm. This wafer and the other wafer were thoroughly cleaned on the surfaces at which they were to be joined together. The two wafers were then bonded temporarily by wringing and subjected to a heat treatment at about 1,000° C. During the heat treatment, the two wafers were pressed with a ceramic clamp to ensure that they would be intimately bonded together. As a result, the two wafers were successfully bonded to each other over substantially the whole are,, and the resulting assembly was cut to produce a plurality of discrete chips of optical fiber coupling member having a desired size.

Each of the optical fiber coupling members in a chip form was equipped with optical fibers and accommodated in a housing to make a six-fiber optical connector. Guide pins having an outside diameter of 0.499 mm were inserted into the guide pin holes in any two of the fabricated optical connectors in such a way that they were coupled together. Measurement of coupling loss of these connectors on single-mode fibers gave a value of 0.21 dB as an average for 120 fibers (n=120). In addition to their low-loss property, the connectors were very simple to assemble.

In order to evaluate the reliability of the connectors at the bonded surface, they were subjected to a variety of tests including a heat cycle test (−40° C. to +70° C.), a wet heat resistance test (80° C.×95% rh), an impact test and a failure test. In none of the tests conducted did the couplers develop any phenomenon that would be a problem in practical applications.

Figure 33:
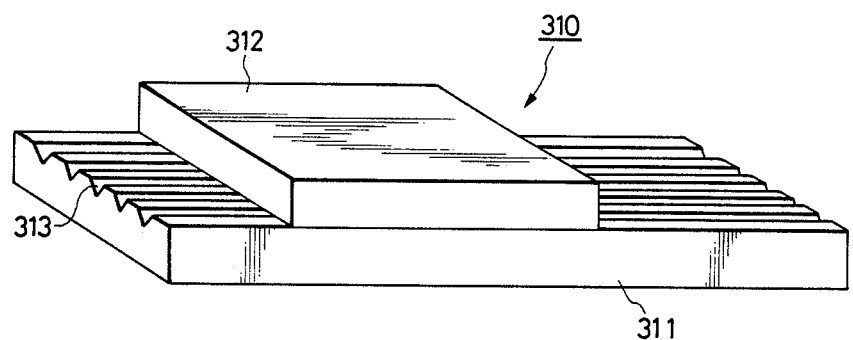
FIG. 33 is a perspective view showing a mechanical splicer according to the present invention.
Figure 34:
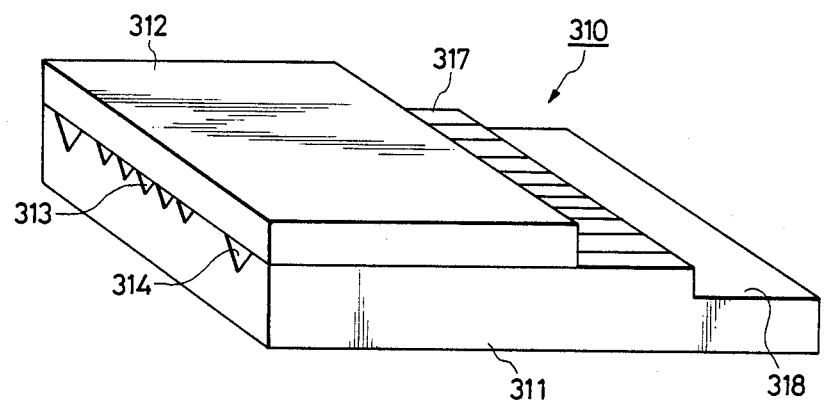
FIG. 34 is a perspective view showing an optical fiber coupling member of the present invention.

The foregoing explanation of the Example was directed to an optical connector. However, it should be noted that the optical fiber coupling member of the present invention can be applied to a mechanical splicer of the type shown in FIG. 33 in which optical fiber guide grooves 313 become exposed on both sides when a cover plate 312 is joined to the top surface of a grooved substrate 311 and in which optical fibers are inserted into these guide grooves in such a way that they about against each other in optical fiber guide holes. FIG. 34 shows another modification of the optical fiber coupling member of the present invention; when a grooved substrate 311 and a cover plate 312 are joined in such a way that their end surfaces are in the same plane, part of the optical fiber guide grooves 313 becomes exposed, with a step portion 318 for fixing an array of optical fibers being provided in the rear end portion of the grooved substrate 311.

As described in the foregoing, the optical fiber coupling member of the present invention differs from the prior art in that it does not employ a sandwitch structure in which a cover plate is bonded to a grooved substrate with a layer of an adhesive agent being interposed therebetween. Instead, the optical fiber guide holes in the coupling member of the present invention are formed by directly bonding a cover plate to a grooved substrate through heat treatment without using any adhesive agent. The coupling member of the present invention can be easily assembled by merely inserting optical fibers into these optical fiber guide holes. The optical fiber coupling member of the present invention exhibits strong adhesion between the cover plate and the grooved substrate, can be machined to high dimensional precision, and ensures high reliability.

According to the process of the present invention, two wafers, one being a substrate wafer provided with guide grooves by machining and the other being a cover plate wafer, are joined and the combination is cut into discrete chips of coupling member in which a grooved substrate and a cover plate are joined into a unitary assembly. Therefore, the process of the present invention is adapted for large-scale production of optical fiber coupling members. In joining two wafers by heat treatment, any water and impurity present on the surface of each wafer must be removed and this can be achieved efficiently by making use of guide grooves and other grooves that run across the combination of two wafers.

Figure 37:
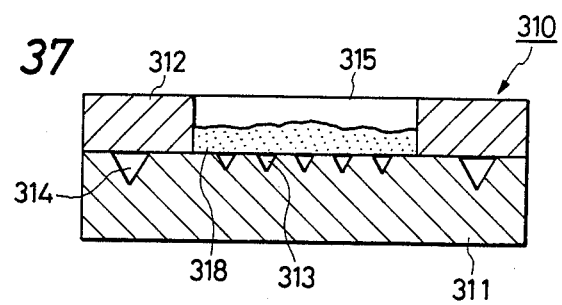
FIG. 37 illustrates how the optical fiber coupling member of the present invention presents an adhesive agent form flowing out of the member.

As shown in FIGS. 29A to 29D, a cover plate 312 which is typically made of silicon is joined to a grooved substrate 311 that may also be made of silicon and which has optical fiber guide grooves 313 and guide pin grooves 314 formed in its top surface by machining so as to provide an assembly having optical fiber guide holes 313' and guide pin holes 314' formed in its interior. the portion of the cover plate 312 which lies over the rear part of the optical fiber guide grooves 311 is removed to form a cutout 315 so that optical fibers can be easily inserted into the optical fiber guide holes 313'. On the other hand, the portion of the cover plate 312 which lies over the guide pin grooves 314 is not removed so that an adhesive agent 318 which is injected in order to securely fix optical fibers in the optical fiber guide holes 313' and grooves 313 will not flow into the guide pin grooves (see FIG. 37).

In the optical fiber coupling member of the present invention, optical fiber guide holes are formed by simply joining a grooved substrate and a cover plate. Therefore, optical fibers can be easily inserted and assembled to provide a coupling member that is capable of positioning optical fibers with dimensional precision.

The optical fiber coupling member of the present invention can be produced by performing precision-bonding of a cover plate to a grooved substrate that has been provided with guide grooves by precision machining. Therefore, by employing wafers as the starting grooved substrate and cover plate, a plurality of optical fiber coupling members can be produced simultaneously without impairing the dimensional precision of the couplers.

The optical fiber coupling member of the present invention is also characterized in that a cutout is provided by removing the portion of the cover plate which lies over the rear part of the optical fiber guide grooves and this allows optical fibers to be easily inserted into the optical fiber guide holes. If, in this case, the portion of the cover plate which lies over the guide pin grooves is left intact (i.e., remains bonded to the grooved substrate), it can be ensured that an adhesive agent used in order to fix optical fibers will not flow out of the system or flow into the guide pin grooves.

EXAMPLE

As shown in FIG. 31A, a silicon wafer 332 serving as a cover plate was provided with a plurality of rectangular windows 334 by a suitable method such as etching. As shown in FIG. 31B, another silicon wafer 331 that would serve as a grooved substrate was provided with a continuous pattern 333 of optical fiber guide grooves and guide pin grooves by cutting with a V-shaped diamond wheel. Both guide pin grooves and the optical fiber guide grooves were precision-machined so that they would accommodate inscribed circles having diameters of 0.5 mm and 0.125 mm, respectively. The rectangular windows 334 may be formed by ultrasonic working instead of etching, and the V grooves may be produced by etching utilizing the anisotropic nature of silicon.

Figure 31C:
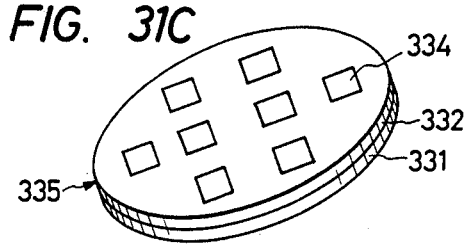
Figure 31D:
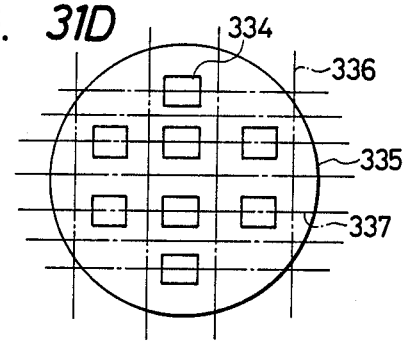
Figure 31E:
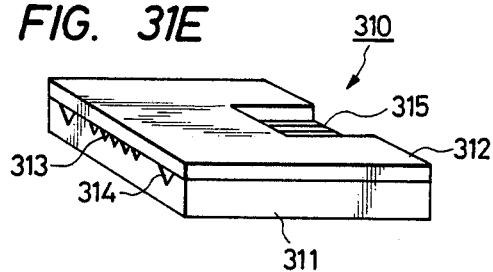
Figure 31F:
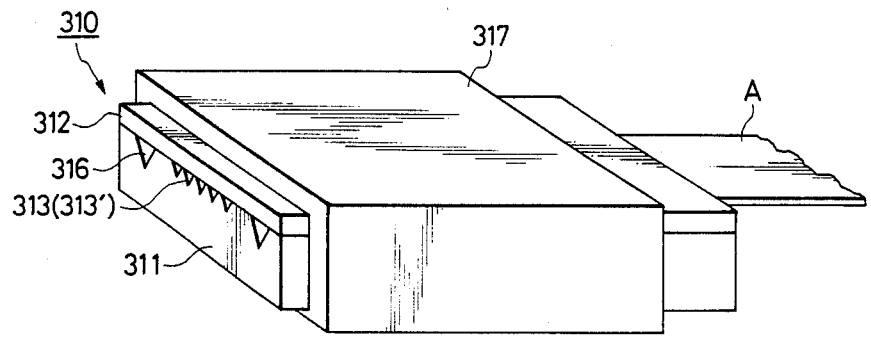

The two wafers 332 and 331 were then joined precisely to produce an assembly 335 as shown in FIG. 31C. Precision joining may be achieve either by using a thin film of adhesive agent or by direct silicon-to-silicon bonding involving a heat treatment at elevated temperatures. The resulting assembly was cut into a predetermined shape along lines 336 and 337 as shown.in FIG. 31D, thereby producing discrete chips of optical fiber coupling member 310 each having a cutout 315 in the cover plate 312 lying over the rear part of the optical fiber guide grooves 313 (see FIG. 31E).

Figure 35A:
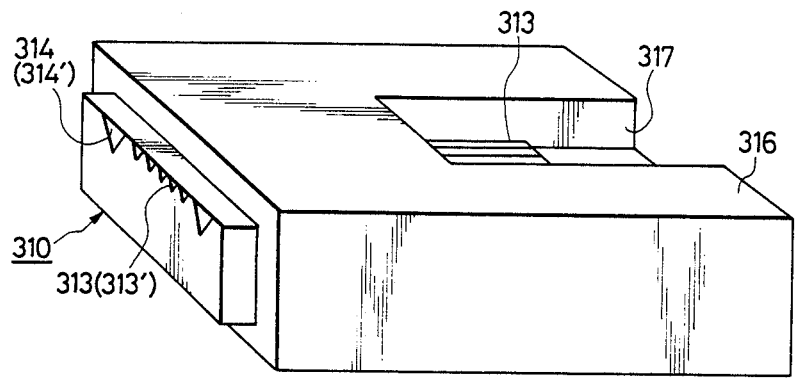
FIGS. 35A and 35B show an optical fiber coupling member accommodated in a plastic housing.
Figure 35B:
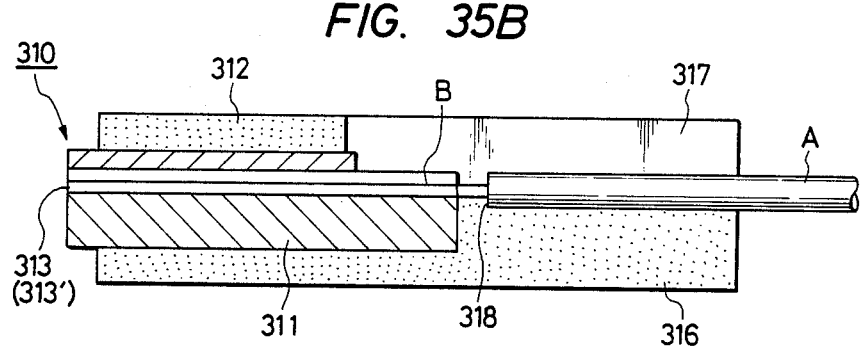

Each of the optical fiber coupling members 310 in a chip form was accommodated in a plastic housing 316 as shown in FIGS. 35A and 35B.

Figure 2:
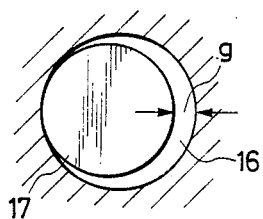
FIG. 2 illustrates the problem that affects the optical connector shown in FIG. 1.

FIGS. 35A and 35B show an optical fiber coupling member accommodated in a plastic housing; FIG. 35A is a perspective view, and FIG. 35B is a longitudinal section showing an optical fiber (B) fixed in position in the optical fiber coupling member 310. As shown, the plastic housing 316 has a step portion 318 in which an array of optical fibers (A) is to be fixed by adhesive bonding. In the embodiment shown in FIG. 2, the plastic housing 316 is also provided with a cutout 317 its top surface in an area that corresponds to the cutout 315 in the cover plate 312 of the optical fiber coupling member 310. This cutout 317 facilitates the insertion of optical fibers (B) into the optical fiber guide holes 313'. As is also shown in FIGS. 35A and 35B, the optical fiber coupling member 310 projects by a distance of about 0.5 mm from the front face of the plastic housing 301 in which it is accommodated. This offers the advantage that the are that requires to be ground and polished is limited to the front face of the optical fiber coupling member 310.

Figure 36:
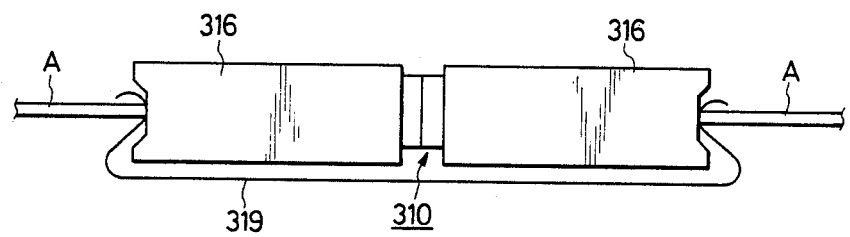
FIG. 36 is a top view of two units of the optical fiber coupling member in the plastic housing.

FIG. 36 is a top view of two units of the optical fiber coupling member 310 in the plastic housing 316 that are coupled together by means of guide pins and which have been secured in position with a clamper 319. In order to evaluate the performance of the optical fiber coupling member of the present invention, six-fiber optical connectors on single-mode fibers were fabricated and subjected to a test; they achieved a very low average coupling loss of about 0.23 dB with an index-matching medium.

The foregoing explanation of the Example was directed to an optical connector. However, it should be noted that the optical fiber coupling member of the present invention can of course be applied to a mechanical splicer in which optical fibers are coupled in alignment by being allowed to about against each other in the same guide groove. In this case, too, a cutout may be provided in part of the cover plate in order to prevent an adhesive agent from flowing out of optical fiber guide grooves to affect other sites of the splicer.

As described on the foregoing pages, the optical fiber coupling member of the present invention allows for easy insertion of optical fibers into optical fiber guide holes, thereby improving the efficiency of assembly operations.

In the optical fiber coupling member of the present invention, a cutout is made in the portion of the cover plate which lies over the rear part of the optical fiber guide grooves while the portion of the cover plate lying over the guide pin grooves is left intact and remains bonded to the grooved substrate.. This arrangement is effective in preventing an adhesive agent injected into the optical fiber guide grooves form flowing into the guide pin grooves or from flowing out of the system.

In addition, the optical fiber coupling member of the present can be fabricated in a high production rate by employing wafers as the starting grooved substrate and cover plate.

Figure 38A:
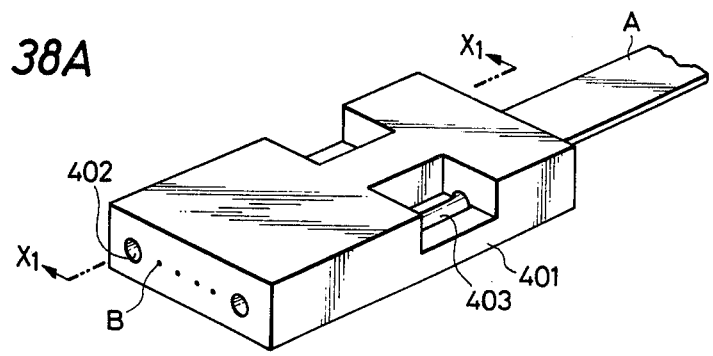
FIG. 38A is a perspective view of an optical connector of the present invention in which part of the optical connector ferrule is cut out.
Figure 38B:
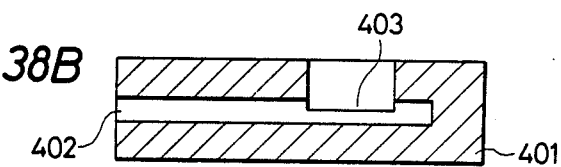
FIG. 38B is a cross section of FIG. 38A as seen in the direction indicated by arrows XI—XI.
Figure 38C:
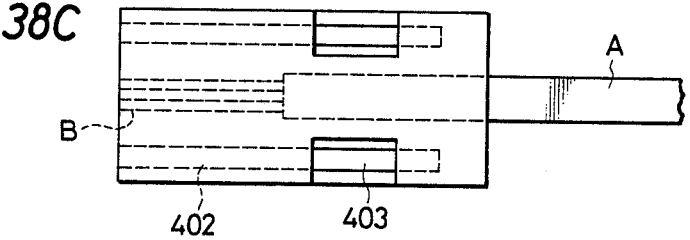
FIG. 38C is a top view of FIG. 38A.

FIGS. 38A to 38C are sketch of an optical connector according to one embodiment of the present invention; FIG. 38A is a perspective view; FIG. 38B is a cross section of FIG. 38A as seen in the direction indicated by arrows $X_1$—$X_1$; and FIG. 38C is a top view.

In FIGS. 38A to 38C, the numeral 401 signifies an optical connector ferrule formed by a suitable technique such as resin molding and which has two guide pi holes 402 formed therein. Individual optical fibers (B) in a fiber array (A) are precisely fixed in position with respect to the guide pin holes 402. The two guide pins are first inserted into the guide pin holes 402 in on connector ferrule 401, then inserted into the corresponding holes in the other ferrule which is positioned in registry with the first ferrule, thereby allowing the two ferrules to be coupled together.

In the embodiment shown in FIGS. 38A to 38C, part of the optical connector ferrule 401 is cut out so that part of the guide pin holes 402 is exposed in that area indicated by 403. When two optical connectors are coupled together with guide pins inserted into such partly exposed guide pin holes 402 in the connector ferrule 401, the guide pins will also become exposed in the area 403 where the guide pin holes are exposed.

Figure 39:
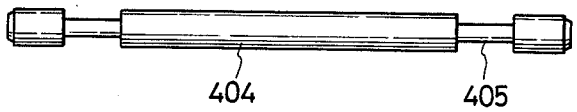
FIG. 39 is a side view showing one example of the guide pin used in coupling optical connectors according to the present invention.

FIG. 39 is a side view showing one example of the guide pin 404 used in coupling optical connectors according to the present invention. As shown, the guide pin 404 is provided with a recess 405 in that portion which is to be situated in the area 403 when it is inserted into a guide pin hole 402 in the connector ferrule 401 shown in FIGS. 38A to 38C. The guide pin 404 can be secured in position by causing a clamp mechanism to act in the recess in the manner to be described later in this specification. It is not always necessary to provide the recess 405 and if it is not provided, the guide pin may be clamped by allowing the necessary amount of lateral pressure to act on the pin.

Figure 40A:
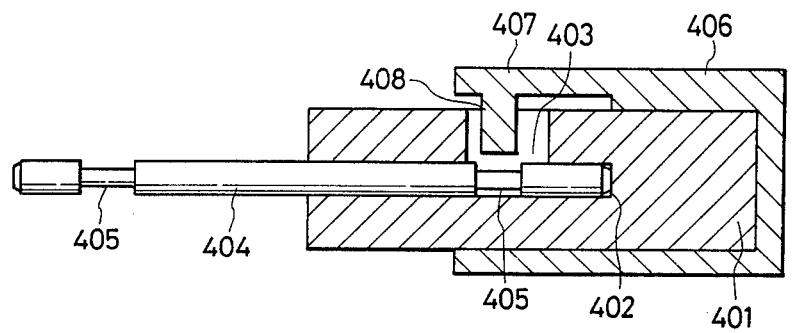
Figure 40B:
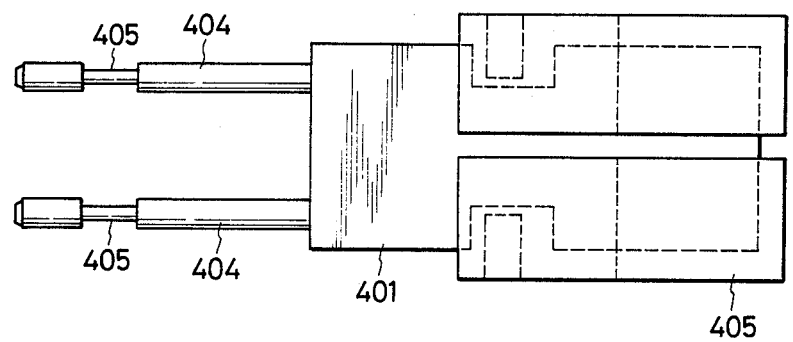

FIGS. 40A and 40B illustrate an optical connector ferrule into which guide pins have been inserted and which is equipped with a clamp mechanism. FIG. 40A is a longitudinal section and FIG. 40B is a top view.

In the embodiment shown in FIGS. 40A and 40B, the optical connector ferrule 401 is provided with a flange 406 in its rear portion and this flange 406 has a clamp mechanism as an integral part thereof. Stated more specifically, the top of the flange 406 provides an elastic beam 407 from which a plunger 408 projects downwardly. By exerting pressure on the elastic beam 407, the plunger 408 moves downward until it contacts the bottom of the recess 405 in the guide pin 404. According to the present invention, the optical connector is disconnected after the plunger has been urged into contact with the bottom of the recess 405, so the guide pins 404 are always left behind in the connector ferrule that has this urged elastic beam.

Figure 41:
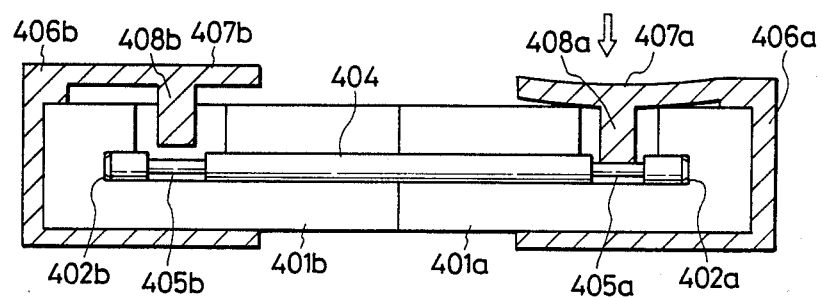
FIG. 41 is a longitudinal section of two optical connector ferrules that have been coupled together end to end by means of guide pins.

FIG. 41 is a longitudinal section of two optical connector ferrules 401a and 40b that have been coupled together end to end by means of guide pins 404. As shown, the connector ferrules 401a and 401b are equipped with flanges 406a and 406b having elastic beams 407a and 407b, respectively. The elastic beam 407a shown on the righthand side of FIG. 41 is urged downward to bring the plunger 408a into contact with the bottom of recess 405a in the guide pin 404. On the other hand, the other elastic beam 407b is not urged, so the plunger 408b remains distant from the bottom of the other recess 405b in the guide pin 404. If the connector ferrule 401a under this condition is disconnected from the other ferrule 401b, the guide pin 404 is sure to be left behind in the ferrule 401a which is shown on the righthand side of FIG. 41.

Figure 11A:
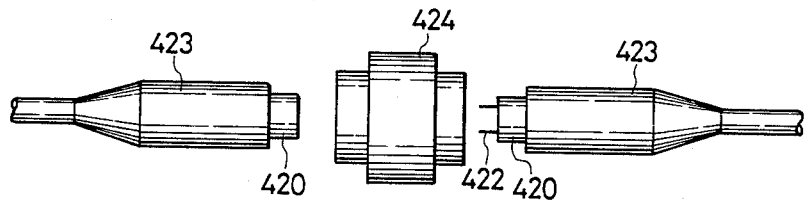
FIG. 11A is a sketch of an optical connector that employs an optical connector plug and an adapter for coupling purposes.
Figure 11B:
FIG. 11B is a sketch of a chip that may be employed to secure two connector ferrules.

If the coupling method to be used is of the type shown in FIG. 11A, an optical connector plug is coupled to an adapter in a housing. In this case, an urging or pressure-exerting portion may be provided in the plug in such a way that if the plug is disconnected from the adapter, the clamp mechanism will spontaneously act on the guide pins in the plug and the operator is capable of extracting the guide pins together with the plug.

Figure 42A:
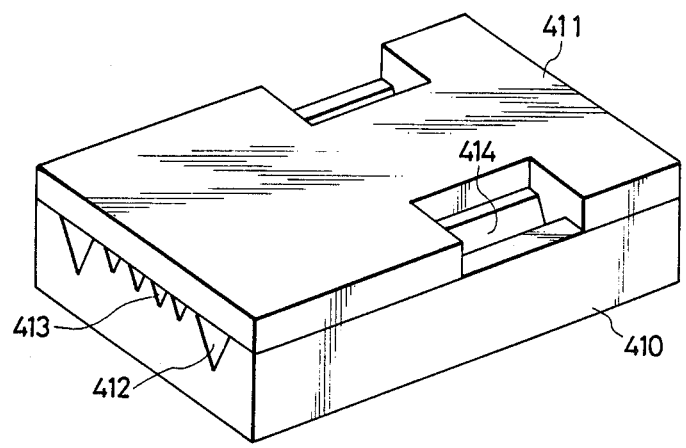
FIGS. 42A to 42C show other embodiments of the area where the guide pin holes are exposed.
Figure 42B:
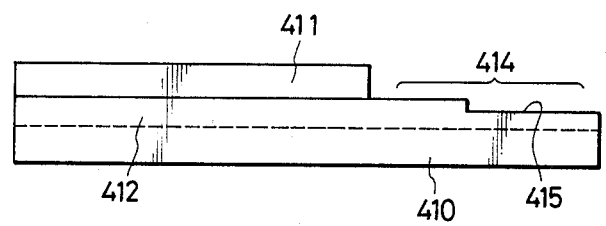
Figure 42C:
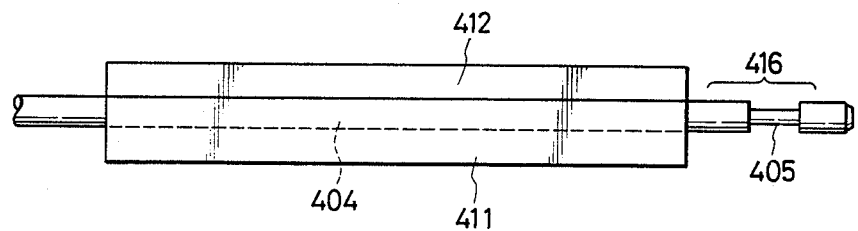

FIGS. 42A to 42C show other embodiments of the area where the guide pin holes are exposed.

FIG. 42A shows an optical connector ferrule in which a silicon to plate 411 is stacked on a grooved silicon substrate 410 having optical fiber guide grooves and guide pin grooves formed in its top surface and the two members are joined together with an interposing thin layer of an adhesive agent so as to form optical fiber guide holes 413 and guide pin holes 412. As shown, cutouts 414 are formed in part of the top plate 411 so that part of the guide pin grooves is exposed in those areas, and plungers are caused to move downward in such a way that they contact the bottom of the exposed areas 414 to clamp the guide pins.

FIG. 42B shows an embodiment in which an optical connector ferrule is formed by joining a grooved silicon substrate 410 and a top silicon plate 411 as in the case shown in FIG. 42A. In this embodiment, part of the guide pin holes 412 is made exposed by entirely removing the rear portion of the top plate 411. A step portion 415 provided in the rear portion of the grooved substrate 410 serves as an area for fixing an array of optical fibers in position.

FIG. 42C shows the case of employing a guide pin 404 that is longer than the optical connector ferrule; in this embodiment, the portion 416 that projects form the rear end of the ferrule is used as the area where the guide pin is exposed.

As described in the foregoing, the optical connector of the present invention is characterized in that an area where guide pin holes are exposed is provided in part of the optical connector ferrule in such a way that the guide pins will become exposed in this area. If this configuration is combined with a clamp mechanism, the operator can disconnect and connect optical connector ferrules while having exact knowledge as to in which ferrule the guide pins have been left behind.

An example of the clamp mechanism that performs its function by exerting pressure is shown in FIGS. 40A, 40B and 41 but depending upon the specific use or dimensions of the connector ferrule, various modifications can be made without departing from the scope and spirit of the present invention by introducing some special features into the design of the flange to be mounted on the ferrule or of the housing of the connector plug.

EXAMPLE

A four-fiber optical connector ferrule of the type shown in FIGS. 42A to. 42C was fabricated by joining a grooved silicon substrate and a flat silicon plate. A flanged pressure-exerting device of the type shown in FIG. 3 was mounted on the ferrule and the assembly was subjected to an experiment. The guide pins used in this ferrule had an outside diameter of 0.7 mm and were provided with a recess having an outside diameter of 0.3 mm. Each of the guide pins had an overall length of 8 mm and the recess on either side of the guide pin was 1.5 mm long. The flanged pressure-exerting device was formed of a plastic and permanently fixed to the silicon connector ferrule with an adhesive agent.

The experiment was conducted in order to evaluate the following parameters: optical coupling loss; the variation in coupling loss due to repeated connect/disconnect cycles; and the success rate of leaving guide pins behind in the proper ferrule after disconnecting operations. The average coupling loss was 0.28 dB and the variation in coupling loss due to repeated connect-/disconnect cycles was within 0.08 dB. In a connect-/disconnect test (n=500), the guide pins were always left behind in the ferrule that was urged by the pressure-exerting device and this demonstrate the fact that the operator is able to perform disconnecting and connecting operations while having exact knowledge as to in which ferrule the guide pins have been left behind.

In the optical connector of the present invention described above, part of the guide pins are exposed from the connector ferrule. If this feature is combined with a clamp mechanism, the operator can have exact knowledge as to in which optical ferrule guide pins have been left behind after disconnecting operations and this enables the operator to connect and disconnect optical connectors with greatly improved efficiency.

As described above, according to the present invention, the clearance that would occur between the guide pins and the guide pin holes which are to be coupled thereto is entirely eliminated or reduced to a very small value, thereby realizing low-loss coupling of optical fibers in a consistent manner. Further, the optical connector ferrules of the present invention can be precisely and easily disconnected or connected. Still further, the process of the present invention is adapted for large-scale production of optical connectors.

What is claimed is:
1. An optical connector comprising:
   an optical fiber connector ferrule which comprises a substrate plate having at least one optical fiber groove and pin groove each being formed at one surface thereof, and a cover plate joined to said substrate plate to form at least one optical fiber groove hole into which an optical fiber is inserted;
   pin means to be inserted into said pin groove for coupling said optical fiber connector ferrule with another in position, said pin means being made of plastic for absorbing the variation in the diameter of said pin means.
2. An optical connector comprising:
   an optical fiber connector ferrule which comprises a substrate plate having at least one optical fiber groove and pin groove being formed at one surface thereof, and a cover plate joined to said substrate plate to form at least one optical fiber groove hole into which an optical fiber is inserted;

a core member to be inserted into said pin groove or coupling said optical fiber connector ferrule with another in position; and at least one outer layer covering said core member for absorbing the variation in the diameter of said core member, said at least one outer layer covering said core member having a lower Young's modulus than said core member, and said cover plate being joined to said substrate plate to form pin groove holes into which said core member is inserted.

3. An optical connector as claimed in claim 2, in which said outer layer is made of plastic.

4. An optical connector as claimed in claim 2, in which said outer layer is formed by elastic material coating.

5. An optical connector as claimed in claim 2, in which at least part of said pin means forms a small-diameter portion.

6. An optical connector as claimed in claim 2, in which said pin holes have triangular cross sections.

7. An optical connector as claimed in claim 2, in which said pin holes have polygonal cross sections.

8. An optical connector comprising:

an optical fiber connector ferrule which comprises a substrate plate having at least one optical fiber groove and pin groove each being formed at one surface thereof, and a cover plate joined to said substrate plate to form at least one optical fiber groove hole and pin hole into which an optical fiber is inserted;

pin means to be inserted into said pin grooves for coupling said optical fiber connector ferrule with another in position; and a clamper for absorbing the variation in the diameter of said pin means, said clamper having a resilient compressive force and said pin means being positioned in said pin grooves which are exposed and are fixed by said clamper.

9. An optical connector as claimed in claim 8, in which said pin means is made of ceramics.

10. An optical connector as claimed in claim 8, in which said pin means is made of zirconia.

11. An optical connector as claimed in claim 8, in which said substrate plate is joined to said cover plate with a layer of an adhesive material interposed therebetween to form said at least on optical fiber hole and pin holes, no layer of said adhesive material being present over said at least one optical fiber guide groove and said pin grooves.

12. An optical connector as claimed in claim 11, in which said adhesive material has low adhesion.

13. An optical connector as claimed in claim 12, in which said adhesive material is made of resist.

14. An optical connector as claimed in claim 8, in which at least one of said substrate and cover plates is made of silicon.

15. An optical connector as claimed in claim 8, in which at least one of said substrate and cover plates is made of ceramics.

16. An optical connector as claimed in claim 8, in which said cover plate is joined to said substrate plate without an adhesive material.

17. An optical connector as claimed in claim 16, in which said cover plate and said substrate plate are made of silicon, the former being joined to the latter with Si—O—Si bonds.

18. An optical connector as claimed in claim 16, in which said cover plate and said substrate plate are made of silicon, the former being joined to the latter with Si—Si bonds.

19. An optical connector as claimed in claim 8, in which said pin means has a circular cross section and said pin grooves have a non-circular cross section, the former coming in contact with the latter at three points.

20. An optical connector as claimed in claim 19, in which said cover plate is joined to said substrate plate to form said at least one optical fiber hole and pin holes, the portion of said cover plate, which lies over the rear part of said at least one optical fiber groove, being removed to form a cutout in which the rear part thereof is exposed and the portion o said cover plate which lies over the rear part of said pin holes is not removed.

21. An optical fiber as claimed in claim 8, in which said cover plate is joined to said substrate plate to form pin holes each being partly exposed from said optical fiber connector ferrule, said pin means being exposed in the exposed area even when two optical connectors are coupled together.

22. An optical connector as claimed in claim 21, in which said clamper acts in the area where said pin means are exposed.

23. An optical connector as claimed in claim 22, in which said pin means is provided with a recess in the area where said pin means are exposed and said clamper acts on said recess.

24. An optical connector comprising:

an optical fiber connector ferrule which comprises substrate plate having at least one optical fiber groove and in groove each being formed at one surface thereof, and a cover plate joined to said substrate plate by a layer of adhesive interposed therebetween to form at least one optical fiber groove hole into which an optical fiber is inserted, no layer of said adhesive material being present over said a least one optical fiber guide groove and said pin grooves;

pin means to be inserted into said grooves for coupling said optical fiber connector ferrule with another in position; and means for absorbing the variation in the diameter of said pin means.

25. An optical connector as claimed in claim 24, in which said adhesive material has low adhesion.

26. An optical connector as claimed in claim 25, in which said adhesive material is made of resist.

27. An optical connector comprising;

an optical fiber connector ferrule which comprises substrate plate having at least one optical fiber groove and in groove each being formed at one surface thereof, and a cover plate joined to said substrate plate to form at least one optical fiber groove hole into which an optical fiber is inserted at least one of said at least one optical fiber groove and said pin groove being provided with a slit which runs substantially parallel to the axial direction of said at least one optical fiber groove and said pin groove, said slit communicating with said at least one optical fiber groove and said pin groove;

pin means to be inserted into said pin groove for coupling said optical fiber connector ferrule with another in position; and means for absorbing the variation in the diameter of said pin means.

28. An optical connector as claimed n claim 27, in which said pin means is made of ceramics.

29. An optical connector as claimed in claim 27, in which said pin means is made of zirconia.

30. An optical connector as claimed in claim 27, in which at least one of said substrate and cover plates is made of silicon.

31. An optical connector as claimed in claim 27, in which at least one of said substrate and cover plates is made of ceramics.

32. An optical connector comprising:
an optical fiber connector ferrule which comprises substrate plate having at least one optical fiber groove and pin groove each being formed at one surface thereof, and a cover plate joined to said substrate plate to form at least one optical fiber groove hole into which an optical fiber is inserted, one of said substrate and cover plate is made of plastic;
pin means to be inserted into said pin groove for coupling said optical fiber connector ferrule with another in position; and
means for absorbing the variation in the diameter of said pin means.

33. An optical connector as claimed in claim 32, in which said pin means is made of ceramics.

34. An optical connector as claimed in claim 32, in which said pin means is made of zirconia.

35. An optical connector comprising:
an optical fiber connector ferrule which comprises substrate plate having at least one optical fiber groove and pin groove each being formed at one surface thereof, and a cover plate joined to said substrate plate to form at least one optical fiber groove hole and pin hole into which an optical fiber is inserted, said cover plate being provided with a groove disposed over said pin holes;
pin means to be inserted into said pi groove for coupling said optical fiber connector ferrule with another in position; and
an elastic layer in said cover plate groove for absorbing the variation in the diameter of said pin means.

36. An optical connector as claimed in claim 35, in which at least one of said substrate and cover plates is made of silicon.

37. An optical connector as claimed in claim 35, in which at least one of said substrate and cover plate is made of ceramics.

38. An optical connector comprising:
an optical fiber connector ferrule which comprises substrate plate having at least one optical fiber groove and pin groove each being formed at one surface thereof, and a cover plate joined to said substrate plate without an adhesive material to form at least one optical fiber groove hole into which an optical fiber is inserted;
pin means to be inserted into said pin groove for coupling said optical fiber connector ferrule with another in position; and
means for absorbing the variation in the diameter of said pin means.

39. An optical connector as claimed in claim 38, in which said cover plate and said substrate plate are made of silicon, the former being joined to the latter with Si—O—Si bonds.

40. An optical connector as claimed in claim 38, in which said cover plate and said substrate plate are made of silicon, the former being joined to the latter with Si—O—Si bonds.

41. An optical connector comprising:
an optical fiber connector ferrule which comprises substrate plate having at least one optical fiber groove and pin groove having a non-circular cross section each being formed at one surface thereof, and a cover plate joined to said substrate plate to form at least one optical fiber groove hole into which an optical fiber is inserted;
pin means having a circular cross section to be inserted into said pin groove for coupling said optical fiber connector ferrule with another in position, said pin means coming in contact with said pin groove at three points; and
means for absorbing the variation in the diameter of said pin means.

42. An optical connector as claimed in claim 41, in which said cover plate is joined to said substrate plate to form said at least one optical fiber hole and pin hole, the portion of said cover plate, which lies over the rear part of said at least one optical fiber groove, being removed to form a cutout in which the rear part thereof is exposed and the portion of said cover plate which lies over the rear part of said pin holes is not removed.

43. An optical connector comprising:
an optical fiber connector ferrule which comprises substrate plate having at least one optical fiber groove and pin groove each being formed at one surface thereof, and a cover plate joined to said substrate plate to form at least one optical fiber groove hole into which an optical fiber is inserted and pin holes each being partly exposed from said optical fiber connector ferrule;
pin means to be inserted into said pin groove for coupling said optical fiber connector ferrule with another in position, said pin means being exposed in the exposed area when two optical connectors are coupled together; and
means for absorbing the variation in the diameter of said pin means.

44. An optical connector as claimed in claim 43, further comprising clamper means for acting in the area where said pin means are exposed.

45. An optical connector as claimed in claim 44, in which said pin means is provided with a recess in the area where said pin means are exposed and said clamper means acts on said recess.

46. A process for producing an optical connector, comprising the steps of:
preparing a substrate plate wafer and a cover plate wafer;
forming a plurality of optical fiber grooves on a top surface of said substrate plate wafer and a plurality of windows in said cover plate wafer;
stacking said cover plate wafer on said substrate plate wafer;
heating said cover and substrate plate wafers at an elevated temperature to join them into a unitary assembly;
cutting said unitary assembly in a direction that is parallel to said plurality of optical fiber grooves and in a direction that is perpendicular to said plurality of optical fiber grooves and in traversing the centers of said plurality of windows in said cover plate wafer to produce a plurality of chips of optical fiber connector ferrule having a cutout in part of the rear portion of each cover plate; and fixing a plurality of optical fibers in a fiber array in position in a plurality of optical fiber holes.

47. A process for producing an optical connector as claimed in claim 46, further comprising the step of surrounding each of said plurality of chips of optical fiber connector ferrule with a plastic housing except in the area corresponding to said cutout in said each cover plate.

* * * * *